(12) United States Patent
Deshpande et al.

(10) Patent No.: US 6,939,576 B2
(45) Date of Patent: Sep. 6, 2005

(54) POLYMER COATINGS

(75) Inventors: Girish Deshpande, Atlanta, GA (US); Andrew Tye Hunt, Atlanta, GA (US); Subramaniam Shanmugham, Duluth, GA (US); Eric J. Yurtkuran, Atlanta, GA (US); Todd Polley, Atlanta, GA (US); Miodrag Oljara, Avondale Est., GA (US); Tzyy-Jiuan Jan Hwang, Alpharetta, GA (US); Aimee Poda, Atlanta, GA (US); George Neuman, Ann Arbor, MI (US)

(73) Assignee: nGimat Co., Atlanta, GA (US)

( * ) Notice: Subject to any disclaimer, the term of this patent is extended or adjusted under 35 U.S.C. 154(b) by 2 days.

(21) Appl. No.: 10/311,785

(22) PCT Filed: Jun. 27, 2001

(86) PCT No.: PCT/US01/20757

§ 371 (c)(1),
(2), (4) Date: Dec. 18, 2002

(87) PCT Pub. No.: WO02/02320

PCT Pub. Date: Jan. 10, 2002

(65) Prior Publication Data

US 2003/0215644 A1 Nov. 20, 2003

Related U.S. Application Data

(60) Provisional application No. 60/252,311, filed on Nov. 21, 2000, provisional application No. 60/227,837, filed on Aug. 25, 2000, provisional application No. 60/224,674, filed on Aug. 11, 2000, and provisional application No. 60/215,280, filed on Jun. 30, 2000.

(51) Int. Cl.$^7$ .............................. B05D 3/08; B05D 3/00
(52) U.S. Cl. ...................... 427/223; 427/557; 427/447; 427/255.23; 427/255.6; 427/224; 427/383.1; 427/385.5; 427/372.2
(58) Field of Search ........................... 427/447, 255.23, 427/255.6, 554, 557, 558, 559, 223, 224, 383.1, 385.5, 372.2

(56) References Cited

U.S. PATENT DOCUMENTS 5,271,970 A * 12/1993 Gribbin et al. ............. 427/569

* cited by examiner

Primary Examiner—Katherine Bareford
(74) Attorney, Agent, or Firm—Alfred H. Muratori; Wayne E. Nacker

(57) ABSTRACT

Coatings, particularly thin films, of polymeric material are produced in accordance with the invention by applying a finely divided aerosol of polymer solution to a substrate and substantially simultaneously applying an energy source to the applied solution to apply the solution. In cases where the polymer is cross-linking, the energy source assists in cross-linking of the polymer. The preferred energy source is a flame that may optionally or desirably deposit material along with the polymer spray. One particular aspect of the invention is directed to production of polyimide films. In accordance with another aspect of the invention, the co-deposition process is used to provide thin polysiloxane coatings on glass and other substrates.

45 Claims, 5 Drawing Sheets

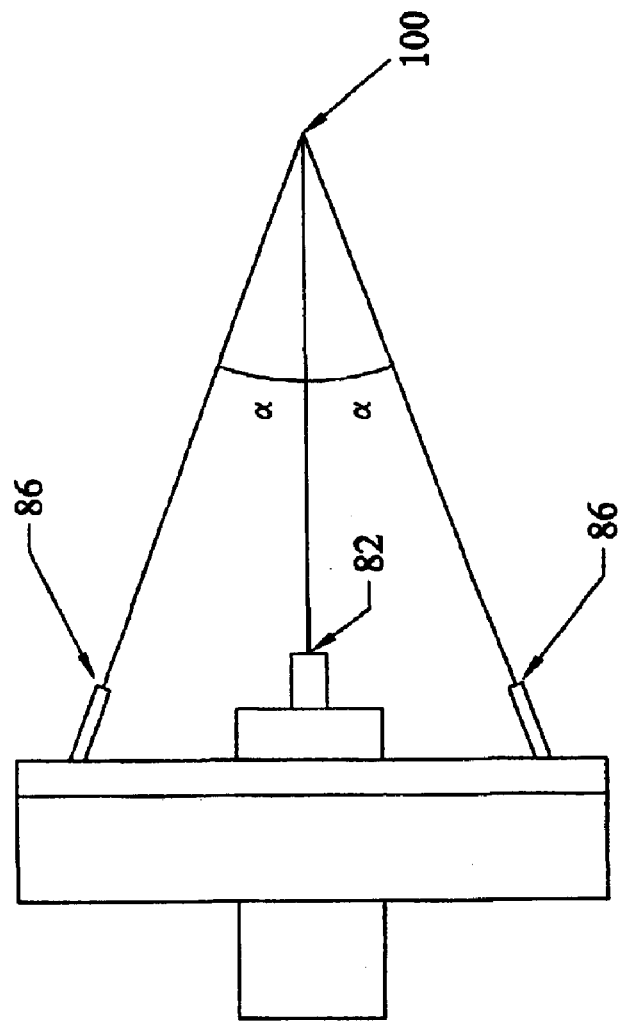
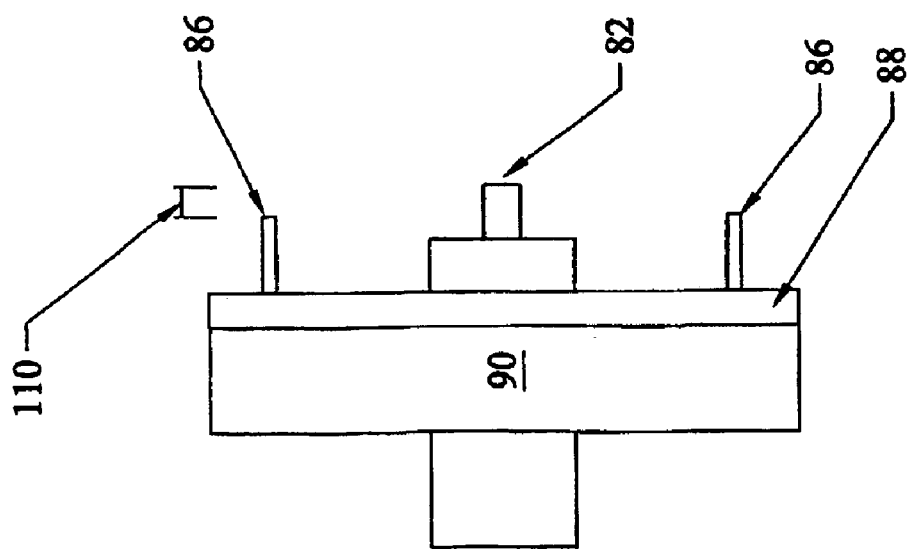

POLYMER COATINGS

CROSS-REFERENCE TO RELATED APPLICATIONS

This application is a national stage application of PCT/US01/20757, filed Jun. 27, 2001, which claims priority of U.S. Provisional Applications Nos. 60/215,280, filed Jun. 30, 2000, 60/224,674 filed Aug. 11, 2000, 60/227,837 filed Aug. 25, 2000 and 60/252,311 filed Nov. 21, 2000.

Portions of the subject matter of this application were developed under National Institute of Standards and Technology contract no. ATP 70NANB8H4071. The U.S. Government has rights in this invention pursuant thereto.

The present invention is directed to deposition of polymers, particularly thin film coatings and to the coatings deposited thereby.

BACKGROUND OF THE INVENTION

U.S. Pat. Nos. 6,013,318, 5,997,956, 5,863,604, 5,858,465 and 5,652,021 and U.S. patent application Ser. No. 09/067,975 are directed to combustion chemical vapor deposition (CCVD) or controlled atmosphere chemical vapor deposition (CACVD) processes. These processes are open atmosphere, generally atmospheric pressure, deposition techniques. These processes are suitable for coating substrates of almost any size because the substrate need not be confined in a chamber or furnace as is the case in conventional chemical vapor deposition (CVD) processes. In these processes, atomization of chemical precursor solutions is effected by passing the precursor solutions under pressure through narrow diameter needles or nozzles. The teachings of each of the above-identified applications are incorporated herein by reference.

Above-referenced U.S. patent application Ser. No. 09/067,975 describes deposition of certain polymers, such as polytetrafluoroethylene and polyimide, from a CCVD or CACVD flame. These two polymers are relatively heat-stable, although either can be degraded during the combustion process. Herein a CCVD co-deposition technique is used to produce polymer coatings on various substrates, such as glass, silicon, paper, metal, or any other substrate on which a polymer coating would serve a useful function.

A variation of the techniques taught in these patents and applications are used herein to deposit polyimide thin films.

SUMMARY OF THE INVENTION

The invention is directed broadly to deposition of polymer or polymers from a fine spray of polymer solution accompanied by substantially simultaneous application of thermal energy to evaporate solvent (including both organic solvents and/or water). By simultaneous application of a thermal energy source to the layer deposited by the fine spray, a very uniform polymer coating is achieved.

The polymer or mixture of polymers may merely be dissolved polymer(s) which dry to form a layer on the substrate, or the polymers may be cross-linking, in which case the thermal energy promotes curing of the cross-linking polymer.

In accordance with a further aspect of the invention, either the heated gasses, such as may be provided by a flame spray, the polymer solution spray or both may contain very finely divided particulate matter, such as carbon black, or finely divided metal, nitride, or carbide particulates. These finely divided particulates are used to impart desired characteristics to the desired coating, such as color, thermal stability characteristics, thermal conductivity properties, strength, hardness, filler loading, or electrical properties including enhanced dielectric characteristics or enhanced conductivity.

The preferred thermal energy source is a flame. The flame may merely provide the energy needed to evaporate the solvent, or the flame may contain chemicals that co-deposit with the spray of polymer or precursors of chemicals that co-deposit with the spray of polymer solution. The co-deposited chemicals may be a material, such as an oxide, which imparts desired characteristics to the polymer coating. The co-deposited chemical may be a catalyst which promotes curing of the polymer layer if the polymer is a cross-linking polymer. "Oxides" as used herein includes metal oxides, such as zinc oxide, metalloid oxides, such as silica, and mixed metal/metalloid oxides, such as aluminum silicates (clay). The term metalloid oxides also include other inorganic oxygen-containing compounds, such as phosphates, carbonates, borates, sulfates, nitrates, etc. Other chemicals, such as nitrides, borides, and carbides may be co-deposited by the method and using the apparatus of the present invention.

The deposited polymer or polymer-based coating may be the entire coating, or the coating may be part of a multi-layer structure deposited by the method of the present invention. For example, the method of the present invention may be used to alternately deposit polymer-based layers and an inorganic oxide, such as silica or alumina.

In accordance with one aspect of the invention, a dense, smooth, thin films of polyimide is formed by first preparing a solution of polyamic acid then depositing the solution as a fine aerosol on a substrate while simultaneously applying a flame or other energy source to the deposited solution.

In accordance with another aspect of the invention, polysiloxane is deposited by a dual deposition procedure of the present invention. Low molecular weight polysiloxane oligomers are dissolved in a carrier solvent to form an oligomer solution that is finely atomized and directed at a first deposition location on a substrate surface. A silica precursor is dissolved in a solvent to form a precursor solution that is finely atomized and ignited to form a flame. This flame is directed at the first deposition location or a second deposition location closely adjacent the first deposition location. Either the oligomer solution and/or the precursor solution contains a catalyst for promoting polymerization of the oligomer. Either or both of the oligomer solution and precursor solution may contain additional components which help determine the characteristics of the cured polysiloxane coating that forms. Deposition conditions significantly affect the nature of the polysiloxane coating that is formed. Post-deposition treatments, such as heat-treatment, also affect the nature of the coating. Various factors, including solution composition, deposition conditions, and post-deposition treatment can be altered to achieve a wide variety of effects, depending upon the requirements of the coating.

BRIEF DESCRIPTION OF THE DRAWINGS

FIGS. 6 and 7 are side views of the deposition apparatus of FIG. 4, illustrating the adjustability of various components thereof

DETAILED DESCRIPTION OF CERTAIN PREFERRED EMBODIMENTS

Figure 1:
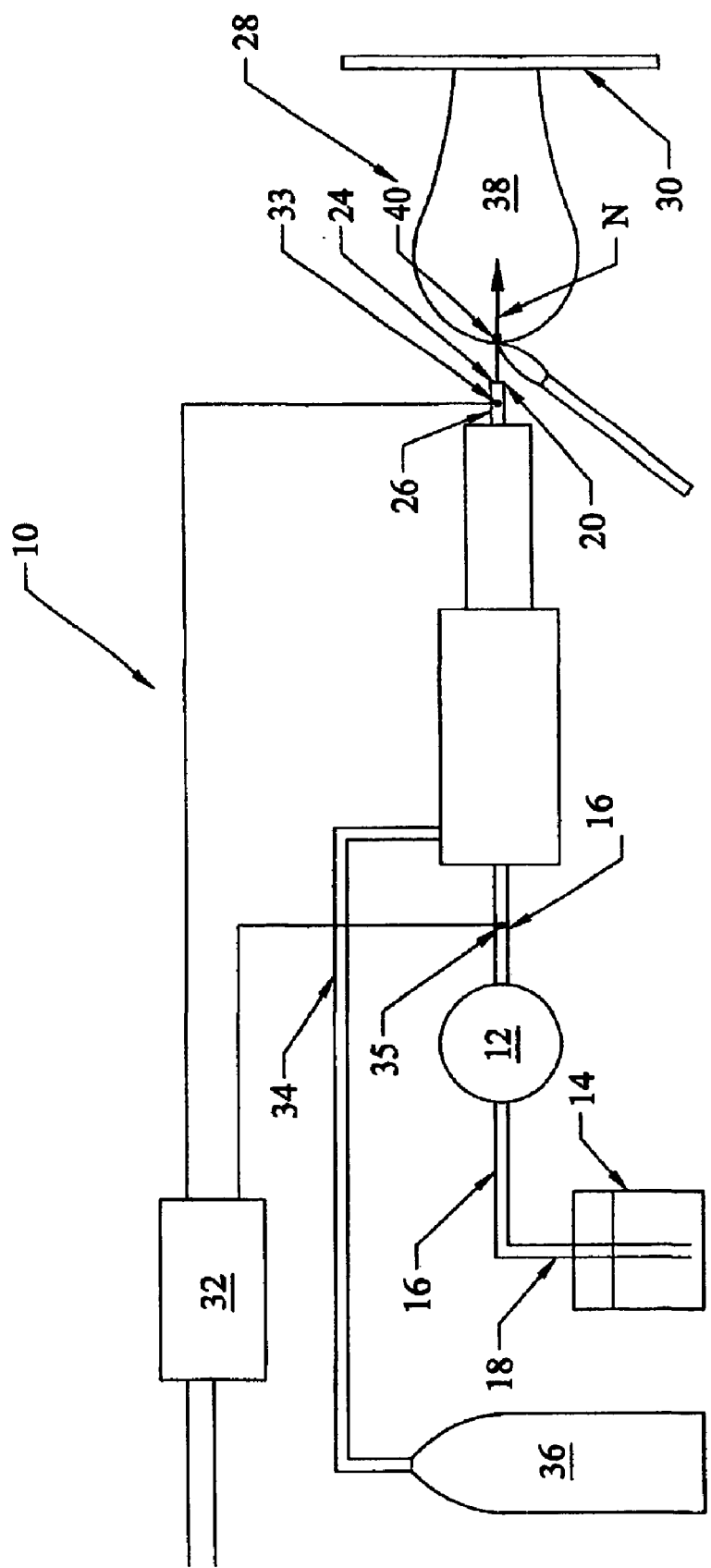
FIG. 1 is a diagrammatic illustration of apparatus for depositing atomized liquid on a substrate surface, which apparatus is suitable for either the non-combustion deposition of the polymer solution, such as polyamic acid solution, or for providing the flame in accordance with the invention.

The present invention is particularly suitable for forming polymer-based films or coatings on a substrate that may be classified as "thin-film", although with sufficient build-up of polymeric material, thicker films can be deposited. Conventionally, "thin films" are considered to be about 10 microns or less in thickness. Continuous thin films down to about 5 nanometers in thickness may be deposited by the method of the present invention.

"Non-curing" polymers that have been deposited by the method of the present invention include polytetrafluoroethylene, sulfonated polytetrafluoroethylene (e.g., that sold as NAFION®) polymethyl(meth)acrylate, polyethylene glycol, and polyacrylic acid. Substantially any polymer, e.g., polyester, polyamide (nylon), etc., that can be dissolved in a suitable solvent may be so deposited. The solvent for the polymer or polymer mixture is generally an organic solvent or mixture of organic solvents, but may be water or a water/organic solvent mixture. To facilitate evaporation of the solvent, it is preferred that the solvent be low-boiling, but this is not a limiting factor as the flame or other energy source can provide sufficient energy to vaporize substantially any solvent in which the polymer or polymer mixture may be dissolved. Some suitable solvents include, but are not limited to, ethanol, isopropanol, propane, toluene, hexane, supercritical fluids, such as supercritical carbon dioxide, supercritical methane, supercritical nitrous oxide, mixed aromatic solvents, glycol, acetone, and methylethylketone. The polymer solutions may range from relatively dilute to relatively concentrated. However, as it is necessary that the solutions be capable of being atomized to provide a very fine spray, the upper concentration limit of the polymer is limited by the viscosity of the solution as well as the solubility of the polymer in the solvent medium. Typically, for use in the present invention, the polymer concentration ranges from about 1 to about 100 gm./liter, preferably between about 5 and about 20 gm/liter.

Supercritical fluids, such as supercritical carbon dioxide, methane, propane and nitrous oxide promote efficient atomization of fluids, i.e., help to achieve the very tiny droplet sizes desired for depositions in accordance with the present invention.

Examples of cross-linking polymers which are advantageously deposited by the method of the present invention include, but are not limited to, polysiloxanes, polyimides, polyamide/imides, polyacrylates, polyepoxies, and polyurethanes. In such cases, the polymer solution may contain, in addition to the polymer, a cross-linking agent and/or a cure catalyst. If a cross-linking agent and/or cure catalyst is included in the polymer solution, it should be substantially inactive at room temperature but act to cure the polymer when the energy is applied simultaneous with deposition of the polymer solution.

To deactivate a catalyst at room temperature an inhibitor can be used. For example, in the case of a room temperature-active catalyst platinum divinyltetramethylsiloxane complex, this may be inhibited by diethyl maleate, dimethyl maleate, or diethyl fumarate for cure of vinylsiloxane oligomers. During atomization the inhibitor would be disassociate, and the catalyst would regain its high activity at room temperature. The inhibitor should be mixed into the polymer solution before addition of the catalyst.

Two polymers may be co-deposited, each of which has functional groups which chemically react with and thereby cross-link with functional groups on the other polymer. In this manner it is possible in certain instances to incorporate two types of polymer backbones in a single polymer layer which might otherwise tend to be incompatible together. For example, one polymer may have epoxy functionality, the other carboxylic acid or hydroxyl functionality.

The polymer solution may contain a mixture of polymers to produce coating which contain the mixture of polymers. For example, polyaniline, a conductive polymer, is generally admixed with other polymers for enhancing strength. Polyaniline and polymers, such as nylons and polyesters, may be co-mixed in a polymer solution to provide conductive polymer layers having required electrical and mechanical properties. Conductive polymers may be applied to fibers as anti-static coatings.

An important aspect of the present invention is the use of very finely atomized sprays or aerosols of polymer solution. Described in above-referenced U.S. Pat. No. 5,997,956 is an atomizer device which can be used to produce aerosols of very small mean particle size. For purposes of this invention, the mean particle size of the aerosol droplets should be 20 microns or less, preferably 10 microns or less, more preferably 1 micron or less and most preferably 0.5 micron or less. This, of course, depends upon the particular embodiment of the invention, and in certain embodiments as described hereinafter, when suspended particulates are included in the polymer solution, the mean particle size may necessarily be of at least a minimum particle size to accommodate the volume of the particulates. The very small droplet sizes used to deposit the polymer solutions contributes to forming very smooth, uniform films.

Also essential to achieving the uniform films of the present invention is the simultaneously application of thermal energy to the freshly deposited polymer solution. The applied polymer solution is dried almost instantaneously before any significant flow of the droplets can occur. This is particularly significant for coating on non-horizontal surfaces. Also, it is believed that the thermal energy helps to fuse the coating to the surface, providing improved adhesion. In the case of curable polymers, the thermal energy begins the cross-linking process immediately upon application, thus contributing to the quality of the coatings. Even for those polymers considered to be "non-cross-linking", these polymers may contain incidental functional groups that react to provide a minimal level of cross-linking that improves the quality of the coating. Also, there is some indication that when a flame is used as the energy source, some oxidation of the substrate surface may occur, and this oxidation may improve adhesion between the substrate surface and the polymer film that forms.

The thermal energy may be provided from a variety of sources, such as heat lamps, heat guns, induction heating, laser energy, etc.

The preferred thermal energy source for purposes of the invention, however, is a flame applied to the freshly coated substrate substantially contemporaneously with the spray of polymer solution. The flame localizes the thermal energy to the point of application of the polymer solution spray. It flashes away the solvent, and the flashed solvent may burn and thereby contribute to the thermal energy. Such burning of the solvent also reduces emissions to the environment. It is to be understood that by generally contemporaneously, it is not required that the flame and polymer spray touch the substrate at exactly the same time, and one may precede the other. Or the substrate may be contacted with multiple sequences of the flame and polymer spray. For example, an oxide-depositing may provide an adhesion-promoting oxide to the substrate surface immediately prior to the polymer solution contacting the substrate surface, or the polymer proceed the oxide-producing flame, whereby a gas barrier thin oxide layer is produced over the polymer layer. In these cases, there may not actually be distinct layers, but a gradient from oxide to polymer or polymer to oxide.

An important reason for using a flame as the energy source is that the flame may be used to co-deposit a flame-produced or flame-contained material along with the polymer spray. Such co-deposited material may provide such properties as UV-barrier, abrasion resistance, IR reflectivity, and other desired properties.

The flame may co-deposit an oxide, such as silica or alumina, with the polymer such that the oxide is homogeneously admixed within the polymer. The oxide is incorporated within the polymer matrix. Deposition conditions will affect the amount of incorporated oxide particulates and the size of the oxide domains. Typically, an oxide is provided, if used, at least about 0.1 wt % relative to the weight of the polymeric material, up to about 50 wt %, and in some cases even up to 100 wt %. The co-deposited oxide may provide strength, thermal, or electrical characteristics to the deposited polymer layer. As the oxide is homogeneously admixed with the polymer on a molecular scale, the co-deposited material may be clearer or be otherwise advantageous to a polymer layer in which particles of such an oxide are included as fillers. Silica or any other ceramic material generally imparts mechanical strength to the polymer and stiffens the polymer.

If the oxide is colored, such as chromium oxide (green), ferric oxide (red), cobalt oxide (blue), titanium dioxide (white), zinc oxide (white) etc. the co-deposited oxide might be used to impart color, and importantly for many applications, a clear colored coating. Cobalt oxide, copper oxide, and several other metal oxides are black, and if used in appropriate amounts in a coating for glass, may impart a darkened window effect. Reduced UV-transmission is particularly important in many applications.

Precursors for noble metals, such as gold or platinum, if used in sufficient amounts, will impart the color of these metals to the coating, and if used even in lesser amounts will impart reflectivity or appearance change in the coatings.

Metals, such as platinum, silver or gold, may provide enhance electrical conductivity, e.g., in conjunction with a conductive polymer, electromagnetic shielding, reflectivity, etc. Controlled atmosphere chemical vapor deposition can be used to deposit more reactive metals, such as copper, nickel, or zinc, with the polymer solution.

Ferrites, such as ferric oxide, can be incorporated in the polymer, either as fine particles from the spray or from ferrite precursor chemicals by the flame and homogeneously admixed in the polymer, to provide magnetic shielding for electronic components. In this regard, soft ferrites, such as $MnFe_2O_4$, $ZnFe_2O_4$, and $NiFe_2O_4$, may be particularly advantageous as they exhibit less of a hysteresis loop relative to hard ferrites.

The flame may contain a catalyst or a precursor for a catalyst that assists in curing the polymer of the polymer solution. For example, the flame may contain a precursor for platinum metal that catalyzes several polymerization reactions. Certain oxides also serve as cure catalysts for many polymer cross linking reactions, including tin oxide, ruthenium oxide, rhodium oxide, tin oxide, and zinc oxide, and precursor chemicals for such oxides may be dissolved in the flame-producing solvent.

Whether or not the flame contains a material or precursor for a material to be deposited with the polymer solution spray, the CCVD or CACVD capabilities of the flame may be utilized to prepare multi-layer coatings of different compositions. For example, the apparatus described hereinbelow in greater detail may be used to alternately deposit a polymer layer and an inorganic material layer, such as a metal layer or an oxide layer such as silica or alumina. When depositing the polymer layer, the apparatus is operated to apply a finely divided aerosol of polymer solution and simultaneously apply the flame as an energy source. At this time, the flame may or may not be co-depositing material at this time. Then, the polymer spray may be turned off and a CCVD or CACVD precursor added to the solvent that produces the flame. An unlimited number of multi-layer combinations may be produced according to utilization requirements. Alternating layers of a wide variety of polymers may be included in a multi-layer laminate, including, but not limited to, any of the polymers discussed above. A variety of polymer types may be included as alternating layers in a single laminate. Polymer layers may be electrically conductive or electrically insulating. Inorganic layers may be conductive, e.g., copper, nickel or platinum; resistive, e.g., a platinum/silica co-deposited layer, or dielectric, e.g., silica or alumina. Specific multi-layer coating applications made possible by the present invention will be discussed hereinbelow.

The solution from which the flame is derived, the polymer solution, or both may contain suspended finely deposited particulate material to impart desired characteristics to a polymer layer. Carbon black may be suspended in a polymer solution to impart electrical or strength characteristics. Likewise, very finely divided metal particulates, such as reduced iron particulates, may be added to the polymer solution for changing electrical characteristics. Finely divided silica particles may enhance the strength of or change the dielectric constants of certain polymer layers. Particulates of carbides and nitrides may also be used to impart desired characteristics.

For use in thin layers, any particulate material should be small. Generally a mean particle size of 10 microns is the upper limit for use in accordance with the present invention. Preferably, the mean particle size is 2 microns or less, more preferably 1 micron or less, and even more preferable ½ micron (500 nanometers) or less. Of course, mixtures and combinations of particulate materials can also be suspended in the flame-producing and/or polymer solution.

One specific type of polymer which can conveniently be deposited by the method of the present invention is polyimide or a polyamide/imide.

In the electronics industry, there is an ever-increasing need to have low-K dielectric materials. The current material of choice is silica which has a dielectric constant of ~3.9. With increasing frequency of signals, and miniaturization of circuits there is a need to use an interlevel dielectric having a dielectric constant of less than 3.9. Polyimides typically have dielectric constants between 2.5 and 3.5. Thus, polyimide is an ideal material for advancement of electronics technology.

The thinner the dielectric layer in a capacitor, the greater the capacitance. Accordingly, it is desirable to have thin, dense layers of polymers. Currently, there is no scalable process for depositing thin films of many polymers, including particulate-filled polymers.

Polyimide thin films have other potential uses, e.g. in providing wear resistance and/or corrosion resistance to a substrate. If applied on a porous substrate, such as α-alumina, a thin polyimide film can be used as a gas separation membrane.

The first step of the process of producing a polyimide involves the preparation of polyamic acid from a diamine and a dianhydride of a tetracarboxylic acid. This reaction is conveniently carried out in a solvent such as a water/alcohol solution, e.g., a 1:1 weight mixture of water and ethanol. The diamine and dianhydride are typically reacted at about a 1:1 molar ration, which molar ratio results in relatively high molecular weight polyamic acid, although molar rations of from about 0.7 to about 1.3 may be used. The reaction produces amide bonds and carboxylic acid groups on adjacent carbons. It is found convenient in the practice of the present invention to form polyamic solutions of about 1–2 weight percent, although this can vary.

A currently preferred combination of dianhydride and diamine is pyromellitic dianhydride (PMDA) and 4,4'-oxydianaline.

Illustrative examples of aromatic bis(ether anhydride)s also useful in the present invention include: 2,2-bis[4-(3,4-dicarboxyphenoxy)phenyl]propane dianhydride; 4,4'-bis(3, 4-dicarboxyphenoxy)diphenyl ether dianhydride; 4,4'-bis(3, 4-dicarboxyphenoxy)diphenyl sulfide dianhydride; 4,4'-bis (3,4-dicarboxyphenoxy)benzophenone dianhydride; 4,4'-bis (3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2, 3-dicarboxyphenoxy)-4'-(3,4-dicarboxyphenoxy)diphenyl ether dianhydride; 4-(2,3-dicarboxyphenoxy)4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy) 4'-(3,4-dicarboxyphenoxy)diphenyl sulfone dianhydride, as well as various mixtures thereof.

Suitable organic diamines of for use in the present invention include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl)ether; bis(p-beta-methyl-o-aminophenyl)benzene; 1,3-diamino-4-isopropylbenzene; 1,2-bis(3-aminopropoxy)ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

The polyamic acid solution is sprayed as a finely divided aerosol onto a substrate. At the same time, a heated gas, such as heated gas from a flame, is produced from a finely divided spray of an organic solvent, such as propane or toluene, and the heated gas is used to evaporate and/or burn components of the polyamic solution and to split water from the polyamic acid and thereby form imide groups. These imide groups include both imide linkages within the same polymer chain and imide linkages between polymer chains, the intramolecular imide linkages serving to cross-link the chains. This cross-linking serves to provide a film with high structural integrity and good electrical characteristics. The heated gas temperature for forming the polyimide is typically between about 300 and about 500° C.

To produce a smooth, dense, thin film of polyimide, it is necessary that the polyamic solution be applied as a finely divided aerosol, preferably with mean droplet size of about 10 micrometers of less, more preferably with mean droplet sizes of about 1 micrometer or less. The flame, a heated gas source, is produced from either vaporized organic solvent or atomized organic solvent, preferably of similar small droplet size. Finely divided aerosols of both the flame-producing liquid and the polymer solution can be produced with apparatus described in above-referenced U.S. Pat. No. 5,997,956 in which fluid is passed under pressure through a constricted nozzle which is heated at its outlet end, whereby the fluid rapidly expands upon exiting the nozzle to produce a finely divided aerosol. Alternative devices may be used to produce finely divided aerosols of liquids, such as finely atomized precursor solutions.

A dual spray system is used to form the polyimide systems, the spray of organic solvent being ignited to form the flame while the polyamic acid solution is sprayed on the substrate without combustion.

As noted above, the outlet end 20 of the fluid conduit 16 is heated. By heating the outlet end, the fluid passing therethrough tends to become superheated, and the superheated liquid tends to rapidly expand upon leaving the outlet end, thereby producing very tiny droplets. By controlling the power supplied to the outlet end 20, droplet size can be controlled. Generally, the smaller the droplet size, the better the coating that is produced. Droplet sizes are preferably about 2 microns or below in diameter, more preferably about 1 micron or below in diameter. (Below 1 micron, it is difficult to measure droplet size by current instrumentation, although ideal conditions may be determined empirically.) Droplet sizes as high as 5–10 microns are generally considered undesirable, although droplets of these sizes may be used to form a wetter, more adhesive coating. Even larger droplet sizes may be used, depending upon the viscosity Wetness appears to be a function of degree of curing. Less curing gives wetter coatings, more curing give dryer coatings. Curing is best promoted by small droplet sizes of both the oligomer solution aerosol and the precursor solution aerosol.

Increasing viscosity tends to generally increase droplet size due to limits of atomizing devices. As higher viscosity droplets tend to be less "wet", they are less flowable, and larger droplets, e.g., up to 100 microns, may be acceptable for certain depositions. Generally the higher viscosity, the lower the solvent usage. Reduced solvent reduces costs and levels of effluents (volatile organic content (VOC)).

For depositions in accordance with the invention, viscosities of polymer solutions may range from about 50 centipoise to about 10,000 centipoise, preferably from about 50 centipoise to about 500 centipoise, more preferably between about 75 centipoise to about 125 centipoise. The solution must be sufficiently non-viscous to pass through the nozzles and achieve adequate atomization, e.g., sufficiently small droplet size.

Likewise a polyimide/polyamide (a polymer having both imide and amide bonds) precursor can be produced from a chemical having both anhydride functionality and acid halide functionality, such as mellitic anhydride, chloride, and a diamine. Polyimide/polyamides, like polyimides, have low dielectric constants. As with the polyimide precursor (polyamic acid), the flame is used in accordance with the present invention to split out water and thereby form the imide bonds. For certain purposes, polyimide/polyamide is preferred to straight polyimide because polyimide/polyamide is water soluble. It can be appreciated that the relative ratios of imide and amide bonds can be adjusted by appropriate selection of precursor chemical mixtures. For example a mixture of pyromellitic dianhydride and mellitic anhydride, chloride can be polycondensed with a diamine to form a polyimide/polyamide polymer with a majority of imide linkages. Hereinafter, the term polyamic acid will use in reference to precursor polymers having polyamic acid bonds, whether or not they contain no amide bonds in the case of a polyimide precursor or they contain amide bonds as in the case of a polyimide/polyamide precursor.

Apparatus suitable for depositing both the flame-producing organic solvent and the polyamic acid solution is described with reference to FIG. 1. The apparatus 10 comprises a pressure regulating means 12 such as a pump, for pressurizing to a first selected pressure one of the fluids (either the organic solvent or the polyamic acid solution) from a solution reservoir 14. The pressurizing means 12 is capable of maintaining the fluid at a pressure above the liquidus of the solution. A fluid conduit 16 has an input end 18 in fluid communication with the solution reservoir 14 and an opposed output end 20 having an outlet port 24 oriented to direct the fluid in the conduit 16 into a region 28 of a second selected pressure below the first selected pressure and in the direction of the substrate 30. The outlet port 24 opens from a constricted region 26 of the fluid conduit 16 that promotes the formation of a finely atomized or nanomized spray N. At it's narrowest constriction, the inner diameter of constricted region 26 ranges from about 10 to about 250 nanometers, preferably 50 to 200. Mean droplet sizes typically range from about 0.1 micrometer to about 10 micrometers. A temperature regulating means 32 is positioned in connection with the output end 20 of the fluid conduit 16 for promoting and controlling atomization. In FIG. 1, the temperature regulating means 32 is a power supply electrically connected at points 33 and 35 to the output end 20 of the fluid conduit 16 for resistively heating the same. The power supplied by the power supply 32 promotes atomization and helps to determine droplet size of the atomized spray N produced at the outlet end 20.

For forming the flame, a gas supply means 34 admixes oxygen from source 36 into the atomized organic solvent for promoting combustion of the atomized solvent. An energy source, e.g., a flame 38, is located at a selected energization point 40 for igniting the atomized precursor solution, providing sufficient energy for combustion.

In the similar apparatus for depositing an aerosol of the polyamic acid solution, neither the gas supply means 34 nor the flame 38 need be present or used.

Figure 2:
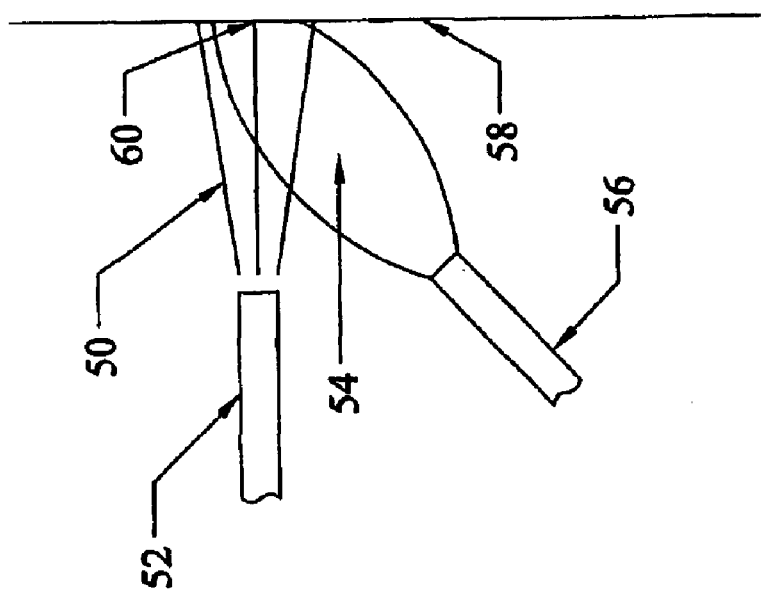
FIG. 2 is a diagrammatic illustration of a non-combustion atomized polymer spray being deposited on a substrate while a flame is being applied to the deposited polymer spray in accordance with the present invention.

FIG. 2 is an illustration of co-deposition of an aerosol of polyamic acid solution 50 from nozzle 52 and a flame 54 of the organic solvent nozzle 56. Both the aerosol 50 and flame 54 impinge on the substrate 58 at substantially the same location 60, although the points of contact of the flame and polyamic acid solution aerosol need not exactly coincide as there is generally relative motion between the deposition nozzles and the substrate.

Electrical and thermal characteristics of a polyimide or polyamide/imide may be modified by inclusion of particulates, such as oxide particulates. Such oxide particulates may include, but not limited to, cesium oxide, alumina nickel oxide, boron oxide, silica, mixed metal and/or metalloid oxides, etc. Semiconducting oxides are particularly useful for altering electrical properties of polymer layers, such semiconducting oxides include, but are not limited to: $SnO_2$, $TiO_2$, $ZnO$, $CeO_2$, $NiO$, $InSnO$, $NiCo_2O_4$, $B_2O_3$, $NbO$, $Cu_2O$, $MgO$, $(LaSr)MnO_3$, $CsLiB_6O_{10}$, $LiB_3O_5$, BST, $Ta_2O_5$, $SrTiO_3$, $V_2O_5$, $PbTiO_3$, $PbZrO_3$, $SrBi_2Ta_2O_9$, and $(ZnO)_x(CdO)_{1-x}$. Other electrical/thermal-modifying particulates include boron nitride and silicon carbide. Such particulates may be suspended in the polymer solution. Typical mean particulate sizes range of modifying particles range from about 2 nanometers to about 20 microns, preferably, between about 15 nanometers and 1 micron. Particulates may also be suspended in the precursor solution for the CCVD flame and delivered by the CCVD flame.

Figure 4:
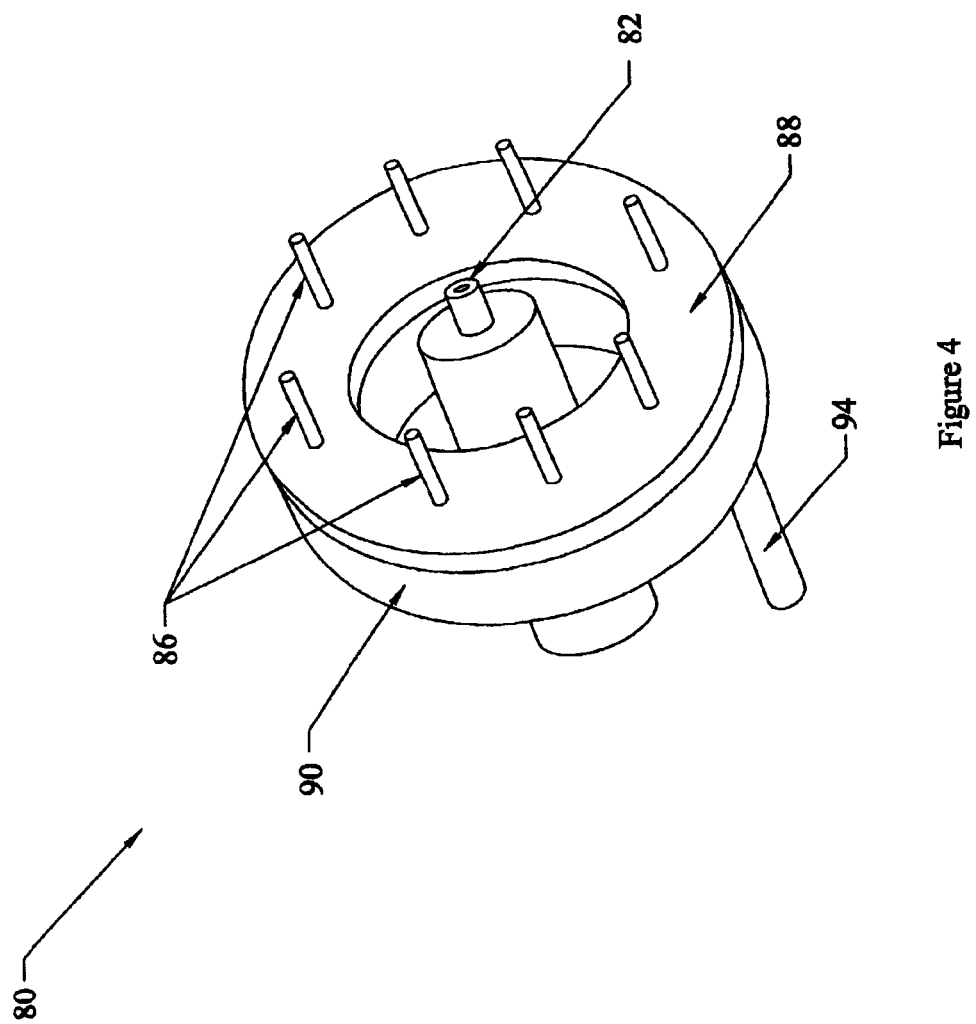
FIG. 4 is an isometric illustration of an alternative embodiment of deposition apparatus useful for forming polymer coatings in accordance with the present invention.
Figure 5:
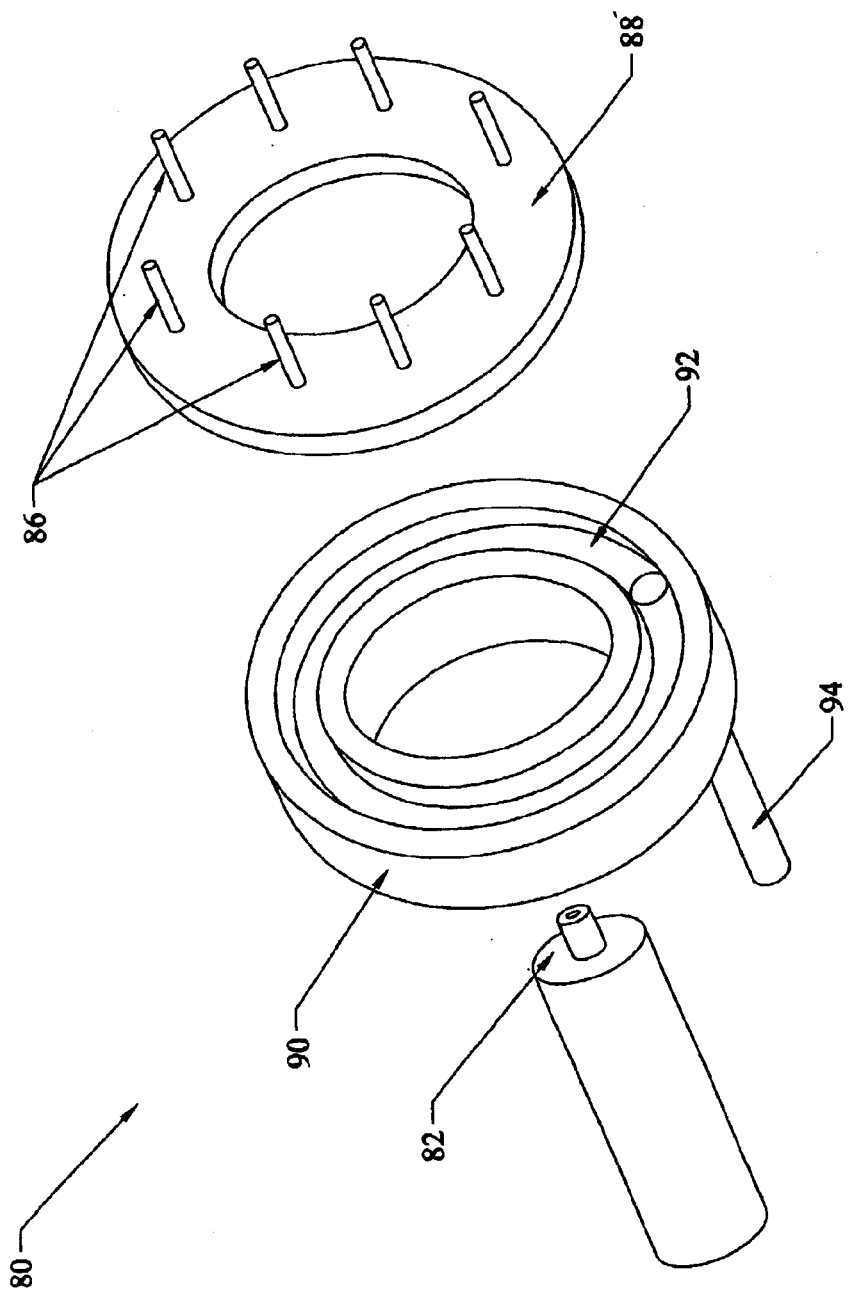
FIG. 5 is an exploded isometric view of the deposition apparatus of FIG. 4.

Illustrated in FIGS. 4 and 5 is an alternative embodiment of deposition apparatus 80 useful for forming polymer coatings with the present invention. In this apparatus, an atomizer nozzle 82 is centrally located. Surrounding the nozzle 82 is a manifold from which a plurality of flame nozzles 86 protrude disposed concentrically around the atomizer nozzle 82. At a minimum, three nozzles 86 arranged in a triangular pattern would be provided, generally at least 4 nozzles in a square pattern would be provided; however, as illustrated, it is preferred to have multiple flame nozzles 86 surrounding the spray nozzle 82. The manifold has a front plate 88 from which the nozzles protrude and a back plate 90 having an annular groove 92. A conduit 94 through the back of the back plate 90 communicates the annular grove 92 with a gas supply. The annular groove 92 distributes the flame gas evenly to the plurality of flame nozzles 86.

An important advantage of this set-up is ensuring that the heat is evenly distributed to the applied spray from nozzle 82. This is particularly important if the spray and substrate are rastered relative to each other in a motion program. Regardless which way the substrate and spray nozzle move relative to each other, the applied spray is subjected to uniform heating by flames from the array of flame nozzles 86. The number of nozzles 86 needed to achieve sufficiently uniform heating for any particular deposition may be empirically determined. The spray from nozzle 82 generally contains the polymer and any material, such as finely deposited particulates, that may be co-deposited with the flame. The flames from flame nozzles 86 may simply provide thermal energy to evaporate carrier liquid from the flame and fuse or fuse/cure the polymer, or the flame may contain chemicals or precursors of chemicals that co-deposit with the polymer to affect the characteristics of the polymer.

In FIGS. 6 and 7, the ability to adjust the flame nozzles 86 is illustrated. Turning to FIG. 6, it is shown that the manifold and flame nozzles 86 can also be moved closer and further from the substrate (relative to the nozzle 82) to adjust the distance 110 that nozzle 82 extends in front of flame nozzles 86. It should be noted that distance 110 can also be negative, as the flame nozzles 86 can be closer to the substrate than nozzle 82. This adjustment changes the level of heat applied to the substrate depending on the specific heating requirements of the coating process. FIG. 7 shows the angular adjustment of the flame nozzles 86, that can be used to concentrate the heat of the flame nozzles to a region closer to the point the spray from nozzle 82 strikes the substrate. The angle between the axis of the nozzle 82 and the axis of each of the flame nozzles 86 is labeled as α. Angle α determines the distance between the nozzle 82 and point 100 where the axes of the flame nozzles 86 and the axis of nozzle 82 intersect. Similar to the other embodiments of the deposition apparatus of the present invention, point 100 may be at the substrate surface, behind the substrate surface or in front of the substrate surface, depending on the heating requirements of the particular deposition method.

Because the polyimide films of the present invention are both smooth and dense, very thin films can serve a variety of functions. Protective layers are typically deposited to thicknesses of 2 to 5 microns. Low dielectric layers may be even thinner, e.g., down to about 0.5 micron. Other applications may require thicker films, e.g., 10 microns in thickness or greater, even 100 microns in thickness up to about 1000 microns in thickness. Generally, however, depositions in accordance with the invention will be about 50 microns or less.

Although the heat of the film will form polyimide from the deposited polyamic acid solution, the organic solvent may contain precursors for a variety of chemicals which may either catalyze the polyimide-forming reaction or affect the properties of the polyimide solution. Platinum catalyzes the polyimide-forming reaction, and the organic solvent may contain an effective level of a platinum precursor that decomposes to produce platinum in the flame. An oxide precursor, such as a silica precursor, may be used to enhance properties such as corrosion resistance and hardness of the polyimide film. It is believed that oxides, such as silica, form nanoclusters that are embedded in the polyimide film.

Precursors for depositing various elements or compounds containing such elements in a flame include, but are not limited to:

| | |
|---|---|
| Ag | silver nitrate, silver trifluoroacetate, silver acetate, silver cyclohexanebutyrate, silver 2-ethylhexanoate |
| Al | aluminum nitrate nonahydrate, aluminum acetylacetonate, triethylaluminum, aluminum sec-butoxide, aluminum iso-propoxide, aluminum bis(2-ethylhexanoate)monohydroxide |
| Au | chlorotriethylphosphine gold (I), chlorotriphenylphosphine gold (I) |
| B | trimethylborate, trimethoxyboroxine |
| Ba | barium 2-ethylhexanoate, barium nitrate, barium acetylacetonate hydrate, bis(2,2,6,6-tetramethyl-3,5-heptanedionato)barium hydrate |
| Bi | bismuth (III) nitrate pentahydrate, bismuth (III) 2-ethylhexonate |
| Cd | cadmium nitrate tetrahydrate, cadmium 2-ethylhexanoate |
| Ce | cerium (III) 2-ethylhexanoate |
| Cr | chromium (III) nitrate nonahydrate, chromium (III) 2-ethylhexanoate, chromium (III) sulfate hydrate, chromium hexacarbonyl, chromium (III) acetylacetonate |
| Cu | copper (II) 2-ethylhexanoate, copper (II) nitrate trihydrate, copper (II) acetylacetonate hydrate |
| Co | cobalt naphthenate, dicobalt octacarbonyl, cobalt (II) nitrate hexahydrate |
| Fe | iron (III) nitrate nonahydrate, iron (III) acetylacetonate |
| In | indium (III) nitrate hydrate, indium (III) acetylacetonate |
| Ir | dihydrogen hexachloroiridate (IV) hydrate, iridium (III) acetylacetonate, dodecacarbonyltetrairidium |
| K | potassium ethoxide, potassium tert-butoxide, 2,2,6,6-tetramethyl-heptane-3,5-dionato potassium |
| La | lanthanum (III) 2-ethylhexanoate, lanthanum (III) nitrate hexahydrate, lanthanum (III) acetylacetonate hydrate, lanthanum (III) iso-propoxide, tris(2,2,6,6-tetramethyl-3,5-heptanedionato)lanthanum (III) |
| Li | 2,2,6,6-tetramethylheptane-3,5-dionato lithium, lithium ethoxide lithium tert-butoxide |
| Mg | magnesium naphthenate, magnesium 2-ethylhexanoate, bis(2,2,6,6-tetramethyl-3,5-heptanedionato)magnesium dihydrate, magnesium acetylacetonate, magnesium nitrate hexahydrate |
| Mo | ammonium molybdate tetrahydrate, molybdenum hexacarbonyl, molybdenum (IV) dioxide bis(acetylacetonate) |
| Na | 2,2,6,6-tetramethylheptane-3,5-dionato sodium, sodium ethoxide, sodium tert-butoxide |
| Nb | niobium (V) ethoxide, tetrakis(2,2,6,6-tetramethyl-3,5-heptanedionato)niobium (IV), niobium (IV) (2-ethylhexanoate) |
| Ni | nickel (II) nitrate hexahydrate, nickel (II) acetylacetonate, nickel (II) 2-ethylhexanoate, nickel (II) napthenate, nickel carbonyl |
| P | triethylphosphate, triethylphosphite, triphenylphosphite |
| Pb | lead (II) 2-ethylhexanoate, lead naphthenate, bis(2,2,6,6-tetramethyl-3,5-heptanedionato)lead (II), lead (II) nitrate |
| Pd | diamminepalladium (II) nitrite, palladium (II) acetylacetonate, ammonium hexochloropalladate (IV) |
| Pt | platinum (II) acetylacetonate, platinum (II) hexafluoroacetylacetonate, diphenyl(1,5-cyclooctadiene)platinum (II), diammineplatinum (II) nitrite, tetraammineplatinum (II) nitrate |
| Ru | ruthenium (III) acetylacetonate |
| Si | tetraethoxysilane, tetramethylsilane, disilicic acid, metasilicic acid |
| Sn | tin (II) chloride dihydrate, tin (II) 2-ethylhexanoate, tetra-n-butyltin, tetramethyltin |
| Sr | strontium nitrate, strontium 2-ethylhexanoate, bis(2,2,6,6-tetramethyl-3,5-heptanedionato)strontium hydrate |
| Ti | titanium (IV) iso-propoxide, titanium (IV) acetylacetonate, titanium (di-iso-propoxide)bis(acetylacetonate), titanium (IV) n-butoxide, titanium (IV) 2-ethylhexoxide, titanium (IV) oxide bis(acetylacetonate) |
| W | tungsten hexacarbonyl, tungsten (VI) fluoride, tungstic acid |
| Y | yttrium (III) 2-ethylhexanoate, yttrium (III) nitrate hexahydrate, yttrium (III) iso-propoxide, yttrium (III) napthoate |
| Yb | ytterbium (III) nitrate pentahydrate |
| Zn | zinc 2-ethylhexanoate, zinc nitrate hexahydrate, zinc acetate |
| Zr | zirconium (IV) 2-ethylhexanoate, zirconium (IV) n-butoxide, zirconium (IV) hexafluoroacetylacetonate, zirconium (IV) acetylacetonate, zirconium (IV) n-propoxide, zirconium dinitrate oxide |

Polyimides and polyimide/polyamides have poor adhesion to certain materials, such as aluminum and glass. In accordance with one aspect of the invention, adhesion of a polyimide/polyamide to substrates having surface —OH groups, such as glass and aluminum, can be improved with an adhesion promoter having at least one chemical moiety which has affinity for the amide bonds of the polymer and at least one chemical moiety which has affinity for —OH groups of the substrate surface. The adhesion promoter is admixed in the polyamic acid solution; thus, it must have sufficient heat resistance to withstand the conditions of flame-curing. The preferred adhesion promoters are silanes. Particularly preferred silanes are selected from the group consisting of aminoalkyltrialkoxysilanes, aminoaryltrialkoxysilanes, thioalkyltrialkoxysilanes, thioaryltrialkylsilanes and mixtures thereof. An adhesion promoter which is readily commercially available for this purpose is aminopropyltriethoxysilane. The amino group has affinity for the amide bonds of the polymer, while the alkoxy groups have affinity for the surface —OH groups. The level of adhesion promoter used depends upon the degree of adhesion required. Generally to have meaningful effect on adhesion, the adhesion promoter is used at a level such that the group(s) having affinity for the amide bonds are at least a 5% stoichiometric equivalent relative to the amide bonds of the polymer, preferably at least a 20% stoichiometric equivalent. Up to 100% stoichiometric equivalent may be used, and even above, although above 100%, little or no additional benefit with respect to adhesion is realized.

The invention also provides for multilayer materials having two or more polymer layers, including two outer polymer layers, and one or more inorganic oxide inner layers. The polyimides and polyimide/polyamides of the present invention are preferred polymers, particularly when the multilayer materials are used as dielectric materials. However, polyimides and polyimide/polyamides also have other desirable properties, such as good water and gas barrier properties. The inorganic oxide layers may be silica, a metal oxide or a mixed oxide.

A reason for using the multilayer structure is that the oxide layer is typically much less expensive than the polyimide or polyimide/polyamide layers. As noted above, these polymeric materials have dielectric constants in the range of 2.5. While silica has a dielectric constant of 4, a porous silica layer may have a dielectric constant significantly lower. The dielectric constant of a porous material is approximately the weighted average of the dielectric constant of the material, e.g., 4 in the case of silica, and air, i.e., 1. Thus, a silica layer having 50% porosity would, like the polyimide, have a dielectric constant of 2.5 ((0.5×4)+(0.5×1). Porosities of oxide layers for use in the present invention generally range from about 5% to about 60%, most typically between about 10% and about 40%. The porous silica (or porous metal oxides) can be deposited by CCVD as described in above-referenced U.S. Pat. No. 5,652,021. Generally the larger the atomized deposition solution, the more porous the deposited material; the finer the droplets of the atomized deposition solution the more dense the layer deposited.

Such multilayer structures may be very easily deposited using the apparatus described above for polyimide or polyimide/polyamide thin film deposition. When the polymer layers are being deposited, deposition proceeds as described above. To switch to oxide deposition, the polyamic acid spray is turned off and the fuel source for the flame is switched to a fuel source containing the oxide precursor, e.g., tetramethylsilane or tetraethoxysilane in the case of silica formation.

Multilayer thin film laminates including polymer layers and oxide layers may be formed from other polymers than polyimides and polyimide/polyamides, depending upon the purpose of the multilayer structure. Generally, it is preferred that the outer layers of such multi-layer structures be polymers, which are easier to planarize relative to oxides. If the oxide is porous, the polymeric material seals the pores against moisture penetration. Moisture is very detrimental to the dielectric constant of materials intended to be low dielectric. The polymers add strength and flexibility to the thin oxide layers. Polymers which may be applied using apparatus as described above include epoxies, polyurethanes, polyacrylates, and polysiloxanes.

Multilayer laminates in accordance with the invention may be very thin, e.g., as thin as 500 microns, but may be deposited to any thickness as more and more layers are applied. Generally, 20 microns is the maximum thickness for dielectric materials, although this may vary. Individual layers of polymers and oxides generally range from about 10 to about 1000 nanometers in thickness, typically between about 50 and about 500 nanometers. As oxide layers tend to be brittle, the flexibility requirements of the end-use application is a limitation to the thicknesses of the oxide layers.

Multilayer laminates in accordance with the invention may be used for other purposes than as dielectrics. These laminates may be used as protective coatings, gas or moisture barrier layers, or for thermal management in electronic or microelectronic circuitry. For such purposes, dense, rather than porous, oxide layers may be deposited. It is noted above that polyimide/polyamide is water-soluble, a desirable characteristic for certain application. On the other hand, for certain applications, particularly electronic applications, moisture susceptibility is not desired. An outer layer of silica or a metal oxide provides moisture protection to a polyimide/polyamide underlayer or underlayers. A reason for using polyimide/polyamide rather than polyimide which is not water susceptible is that polyimide/polyamide is less expensive to produce than polyimide. Again, multilayers which employ inexpensive oxide materials are low-cost. The deposition processes of the present invention are environmentally friendly.

Polyimide/polyamide is water-susceptible because of the amide bonds. Another way of rendering a polyimide/polyamide moisture-stable is to tie up all of the amide bonds, e.g., with hydrogen bonding. This can be accomplished by providing an amine in one of the deposition solutions in sufficient amounts to tie up all or substantially all of the amide bonds of the polymer through hydrogen bonding. The amine selected should be sufficiently non-volatile that it is not evaporated during the deposition/cure process. The adhesion promoters discussed above are ideal for this purpose, providing not only good adhesion of the polymer to the substrate, but if used in sufficient amounts, i.e., at least a stoichiometric equivalent of the amide bonds, render the polyamide/polyamide polymer moisture-stable.

Polysiloxanes are another type of polymer advantageously deposited by the method of the present invention. Polysiloxane coatings have particular utility on glass.

Coatings on glass can serve a number of functions. A hydrophobic polysiloxane coating on automotive windows can promote the beading of rain on the glass and thereby assist subsequent removal of the rain. Polysiloxane coatings on glass can be UV-blocking, IR-reflecting, or may impart anti-glare properties. Herein, it is found that polysiloxane coatings on glass can provide a variety of properties appropriate to the particular application, depending upon precursors used and the conditions under which the polysiloxane coating is deposited on the glass.

Polysiloxane coatings may be deposited on paper to provide adhesive/release characteristics, e.g., for labels. Polysiloxane coatings on metal may provide corrosion and/or tarnish resistance.

The primary coating-forming oligomer is a functionalized polysiloxane oligomer. The preferred functionality is vinyl, the oligomer being terminated at both ends with vinyl functionality that provide for polymerization of the oligomer. Such oligomers have the general formula:

$$CH_2=CH-[-Si(R)_2-O-]_n-CH=CH_2 \quad (I)$$

where the Rs are the same or different and are selected from $C_{1-3}$ alkyl and phenyl, preferably both Rs being methyl; and n=2–20, preferably n=5–10.

The oligomer fraction also contains a cross-linking oligomer having labile hydrogen bonded to silicon atoms, this oligomer having the general formula:

$$Si(R^1)_3-[S(H)(R)-O-]_n-Si(R^1)_3 \quad (II)$$

where R and n are defined as stated above with respect to formula (I) and the $R^1$s are the same or different and are selected from $C_{1-3}$ alkyl and phenyl; preferably all $R^1$s are methyl. The H of the —S(H)(R)— moiety of formula (II) is labile, and with heat and catalysis adds to the vinyl group of the oligomer of formula (I), opening the double bond and promoting a chain addition polymerization.

The weight ratios of oligomer (I) to oligomer (II) may vary from about 25:1 to about 1:1, preferably from about 15:1 to about 5:1. The value of n in each of formulae (I) and (II), i.e., the number of repeat units, may affect the characteristics of the coating which is formed. This is particularly true of oligomer (I) that generally comprises the major portion of the oligomer mixture.

It is necessary that the polysiloxane coating adhere to the surface; accordingly, it is desirable that an adhesion-promoting chemical entity be present. In the case of glass, which has surface —OH moieties or other substrates having significant levels of surface —OH moieties, a bonding silane of the following formula bonds the polysiloxane to the surface:

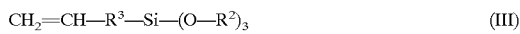  (III)

where the $R^2$s are the same or different and are selected from $C_{1-3}$ alkyl and $R^3$ is $C_1$–$C_6$ straight or branched chain alkylene. Preferably, all $R^2$s are ethyl, i.e., the preferred bonding compound is allyltriethoxysilane. One or more of the —O—$R^2$ groups reacts with the —OH groups of the substrate in a condensation reaction which gives off the alcohol $R^2$OH, while the vinyl group enters into the polymerization reaction of oligomers (I) and (II), thereby chemically bonding the polysiloxane coating to the —OH functional substrate.

The bonding silane (III) is generally used at between about 200 and about 500 ppm (parts per million by weight) relative to the total weight of oligomers (I) and (II).

To provide an oligomer solution, oligomers (I) and (II) and allyltrialkylsilane (III) are dissolved in a carrier solvent, such as toluene, to a combined weight percent between about 0.1 and about 10, preferably between about 0.5 and 2.0. This oligomer solution optionally contains other chemical components which perform various functions, such as catalyzing the polymerization reaction, promoting adhesion to the substrate, or altering the characteristics of the coating that is applied.

Necessary to the coating process of the present invention is the co-deposition of silica by CCVD. In the coating process of the present invention, to achieve uniform deposition, there generally must be relative movement of the deposition sprays to the substrate. That is, either the deposition sprays are moved relative to the substrate, or the substrate is moved relative to the coating sprays. While the first layer of polysiloxane tends to bond well to glass due to the presence of the allyltrialkylsilane (III, subsequent layers of polysiloxane would not bond well to each other without the co-deposition of silica. Silica, though technically $SiO_2$, invariably includes some Si—OH bonds due to pick-up of water in the atmosphere or water produced by the flame. By the co-deposition process, micro silica domains form in the polysiloxane coating. These silica domains bond to the allyltrialkylsilane (III) in the manner that glass bonds to the allyltrialkylsilane.

Figure 3B:
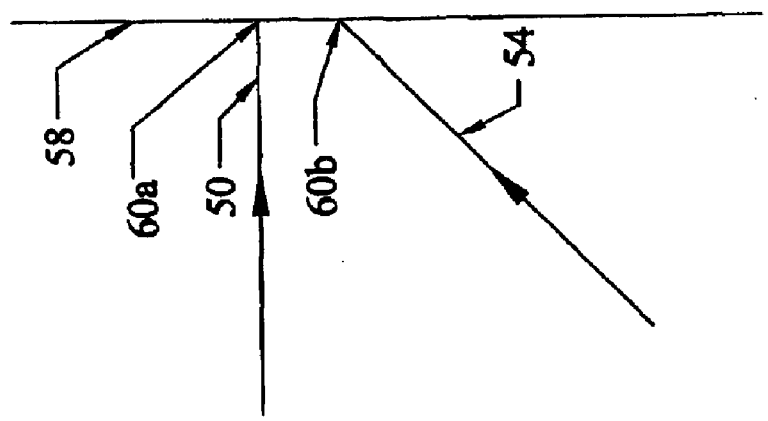
FIGS. 3*a* and 3*b* are diagrammatic illustrations of different contact angles which may be used to achieve different effects in the coating which is deposited.
Figure 3A:
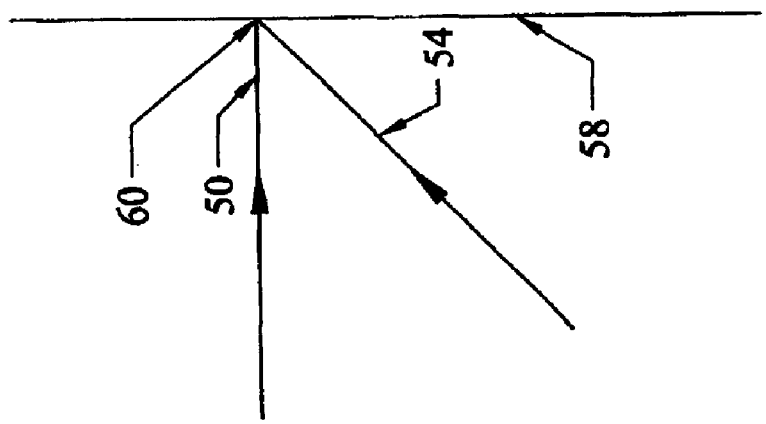

Depositions of polysiloxane is done using the co-deposition apparatus described above with respect to FIGS. 1 and 2 for polyimide. The relative angle of depositions shown in FIG. 2 is that represented by vectors 50 and 54 in FIG. 3a. Because most coating operations involve relative movement between the substrate and the deposition nozzles, the location of impact need not be the same FIG. 3b shows aerosol vector 50 and flame vector 54 impinging at closely adjacent locations 60a and 60b, respectively on the substrate 58. Locations 60a and 60b are generally about 2–10 cm. apart, preferably 3–5 cm. The relative deposition angle shown in FIG. 3a tends to produce a dryer, more hydrophobic coating. The relative deposition angle shown in FIG. 3b tends to produce a tackier coating, such as might be used as an adhesive. Generally, it is found that if the flame and aerosol vectors cross before reaching the substrate, inferior coatings result, although this may not be true in all cases. Deposition angles of both flame and spray may be adjusted to maximum desired results and are empirically determined.

The silica domains in accordance with the present invention are produced in the CCVD flame. Accordingly, the precursor solution contains a precursor chemical for silica, such as tetramethylsilane or tetraethoxysilane. As with the polysiloxane oligomers, the silica precursor is dissolved in a carrier solvent, e.g., toluene, to between about 0.1 and about 10 wt %, preferably between about 0.5 and about 2 wt %. The precursor solution optionally contains additional components, e.g., for catalysis, for adhesion promotion, or for achieving various effects of the polysiloxane coating which forms.

In coatings in accordance with the present invention, silica typically comprises between about 1 and about 20 wt % and polysiloxane between about 80 and about 99 wt % based on total weight of polysiloxane plus silica. The relative amounts of silica and polysiloxane in the coating affect the characteristics of the coating. High levels of silica tend to produce a wet or tacky coating such as might be desired for an adhesive. Lower levels of silica produce dryer, firmer coatings such as are desired for many applications.

The CCVD flame not only provides silica, in some cases the catalyst and other optional components, but also provides thermal energy that helps cure the oligomer components. While the oligomer solution is not flamed as it atomizes, undoubtedly some of the carrier solvent is ignited at the substrate surface and/or is flashed away by the thermal energy of the flame. For various effects, a variety of minor components may be co-deposited with the silica by CCVD.

Either the oligomer solution and/or the CCVD precursor solution preferably contains a catalyst to promote the vinyl addition polymerization reaction. An excellent catalyst, either in complexed form or as a zero valence metal, is platinum. Accordingly, a platinum-containing compound, such as platinum-acetylacetonate or diphenyl-(1,5-cyclooctadiene) platinum, may be added to one or both of the oligomer solution or the precursor solution. If included in the precursor solution, the Pt is believed to deposit within the coating as zero valence Pt. If included in the oligomer solution, the Pt is believed to remain in complexed form. How Pt is added affects the characteristics of the coating that is formed. If the oligomer solution does not include a Pt-containing compound, the coating tends to be clear and hydrophobic. If the oligomer solution includes a Pt-containing compound, the coating is less clear, giving the coating anti-glare properties.

Other suitable catalysts include metal oxides that may be formed in the CCVD flame by incorporating one or more of the above-listed chemical precursors in the precursor solution. Tin oxide is a useful catalyst. A zinc precursor in the precursor solution produces zinc oxide that not only catalyzes the vinyl addition polymerization reaction but also gives IR-reflecting properties to the coating that is formed. A cerium-containing precursor compound or a titanium-containing precursor compound in the CCVD precursor solution produce during combustion, respectively, ceria and titania, each of which catalyzes the vinyl addition polymerization reaction and imparts UV-blocking capabilities to the polysiloxane coatings which form.

The amount of catalyst deposited depends upon the specific catalyst used and the degree and speed of curing desired. Generally, the catalyst is deposited at between about 100 and about 2000 ppm relative to the total weight of oligomers (I) and (II). To give special effects, such as IR-reflecting, UV-blocking, or shading, the level of active co-deposited, property-imparting chemical depends upon the degree of such characteristics desired.

Polysiloxane coatings generally range in thickness from 250 nm to 25 microns (25,000) nm, although most polysiloxane coatings are in the 0.5 to 5 micron range (500–5000 nm).

Coating rates vary according to a variety of factors. As a rough guideline, it is found that a 1 micron thick coating can be produced in 10 minutes pumping oligomer solution at 3 ml/min and depositing at 500° C.

Post treatment by a variety of methods may be used to further cure the coating. Such methods include flame treatment (typically heating the coating to 300–500° C.), oven treatment (also to 300–500° C.), UV-cure, plasma cure, or microwave cure. The post-curing is a polysiloxane "degradation" process that increases the cross-link density of the coating.

An important aspect of the present invention is the wide variety of coating effects that can be produced. Hard permanent layers on glass can be provided which may range from UV-blocking, IR-reflecting, glare-reducing, color-imparting, etc.

Polysiloxane coatings for paper or glass may be provided with a controlled degree of adhesion. Label release paper is produced, for example, under appropriate conditions by the polysiloxane coating method of the present invention. It is surprising that paper can be thusly coated using a flame a part of the deposition source.

Metals, unlike glass, generally do not have —OH groups by which the polysiloxanes of the present invention may bind. It is found that by depositing a seed layer, e.g., between about 10 and about 50 angstroms thick, of platinum by a CCVD process, metals such as brass or stainless steel may be coated with polysiloxane by the methods of the instant invention. Deposition of platinum is taught in above-referenced U.S. Pat. No. 5,997,956. Polysiloxane coatings produced in accordance with the invention may be used to protect metals against corrosion and tarnish.

Some general trends in achieving specific objectives are described above. Optimization of conditions for any particular purpose may be guided by these general trends, but, in most cases, must be empirically determined. It is believed that such optimization can generally be accomplished without undue experimentation by one with ordinary skill in the art.

Another type of material that can be deposited by the method of the present invention is polyepoxides. Highly cross-linked epoxies deposited in accordance with the present invention provide excellent moisture barriers, such as might be desired in food packaging or electrical applications. Important epoxies for this purpose include novolacs and diglycidyl ethers of bis-phenol A. The epoxies may self-cross-link under the heated deposition conditions, particularly if an epoxy cure catalyst, such as platinum, is provided by or produced in either the flame-generating spray or polymer spray. Also, and preferably so, an epoxy curative, such as a diamine (or higher functional amine), may be provided in the epoxy-containing solution to cross-link the epoxy moieties. The amine curative should be selected so as not to significantly react with the epoxy groups prior to deposition but to cross-link the epoxy resin upon application of thermal energy.

Use of a cross-linking agent provides faster processing times, important in continuous production. Use of a cross-linking agent also helps to ensure that there are no un-reacted epoxy groups, thereby producing more stable films.

Polyurethane may be produced by the process of the present invention from solutions containing resins, such as phenolic resins or carboxylic acid functional polymers, and multifunctional isocyanates.

Acrylic resins containing a variety of cross-reactive chemical functionalities may also be used to provide cross-linked polymer layers.

A multi-layer coating with alternating layers of a high cross-link density amine-cured epoxy and an inorganic oxide, such as silica, provides an excellent barrier to moisture and gases, such as oxygen, carbon dioxide and helium. Such barrier properties have applications in food, beverage, and pharmaceutical packaging applications. These properties are also important for packaging electronic components. Such a multilayer structure may have as few as two layers, one of the polymer, one of the oxide, but benefits are found using up to ten layers (5 layers of each). The amine-cured epoxy layer(s), in addition to serving as a moisture and gas barrier, impart flexibility to the multi-layer structure.

Polymer/polymer or polymer/inorganic laminates, by virtue of the method of the present invention, may be deposited on substrates of any three-dimensional geometry.

Polymeric materials having different refractive indexes may be deposited as multi-layer laminates for forming polymer waveguides and polymer lenses.

If the polymeric material is generally incompatible substrate, for example, if it is desired to coat a non-polar substrate with a polymer having a substantial number of polar chemical moieties, poor polymer adhesion may be exhibited. To provide the desired adhesion, multilayers of polymers of different compositions may be applied to a substrate. For example, if it is desired to provide an outer coating of a highly acid-functional polyacrylate to a non-polar substrate, such as polypropylene, a plurality of polyacrylate layers of ascending acid number may be applied as thin films to the substrate.

Because of the very rapid film formation and or film formation/curing, generally non-compatible polymers may be co-deposited such that tiny, individual domains of the polymers may become trapped in a meta-stable state. This may result in films of novel characteristics. For example, two incompatible polymers might, because of the different refractive indexes of the individual polymer domains, produce an anti-glare coating. An example of such a polymer mixture is polymethylmethacrylate and polystyrene.

Because such a mixture of incompatible polymers may be trapped in a meta-stable state, such a polymer blend may exhibit property changes, such as stress-induced changes, in response to outside stimuli, such as temperature change. Such changes may be used as indicators, such as temperature indicators, oxidation indicators, humidity indicators, etc. The fact that films can be made very thin by the method of the present invention and thereby provide a high level of interface with the environment, make them particularly suitable as sensing materials.

Blends of incompatible polymers may exhibit porosity, the degree of which may be determined by deposition parameters, such as flame temperature, substrate temperature, aerosol droplet size, etc. Generally, in such cases, there is a first major proportion polymer which provides the structural integrity and a second minor proportion polymer which induces porosity. The degree of porosity will determine factors such as gas transmission of the film.

Some specific polymer blends which appear to have important uses include mixtures of poly(meth)acrylic acid and poly(meth)acrylate, poly(meth)acrylate) and polyimide; polyimide and epoxy; and poly(meth)acrylate and epoxy.

In fact many benefits accrue from the use of thin films with high levels of interface with the environment or external stimuli. Particles, such as may be co-deposited from the polymer-containing solution, or homogeneously admixed materials, such as may be provided by the flame may impart a wide variety of chemical properties for a wide variety of applications. Rhodium oxide co-deposited in olefin thin films may be used as catalytic beds for polyolefin synthesis. Platinum embedded in polymer, such as Nafion®, serves as a catalyst in fuel cells. Platinum/ruthenium oxide and Platinum/bismuth ruthenium oxide, and carbon/platinum particles in conductive polymer, such as Nafion® or polyaniline, serve as electrodes. Polyvinylidine fluoride may contain materials, such as carbon particles, lithium cobalt oxide, titanium oxide/titanium carbide and serve as electrodes in solid state cells, such as lithium batteries. Polyethylene containing particles of carbon or other conductive material may serve as polyswitches in batteries or the like to prevent over-heating. Thin film polymer containing aluminum silica may serve gas separation purposes.

Polymeric thin films, such as polyethylene oxide, may contain biologically active materials, such as histamines which can be used to detect anti-histamines. Other antigens may be incorporated in the thin films which provide high surface area and thereby good surface/sample interface for detection of various antibodies. The thin films may be used for slow release of chemicals, such as drugs, for either ingestion or topical applications, such as skin patches.

Deposition conditions may be varied to obtain desired characteristics of polymer thin film layers which are deposited. For example, the temperature of the substrate may have a large effect on the nanostructure of the polymer, i.e., highly crystalline, slightly crystalline or amorphous. Polymer layers formed very rapidly may tend to be amorphous, an advantage in the at amorphous materials tend to be very clear. On the other hand, if opacity is desired in the polymer, highly crystalline layers may be produced.

The present invention is useful for producing homogeneous, intimately mixed layers, particularly thin film layers, of polymers and oxides, including mixed metal and/or metalloid oxides, which are useful as the dielectric material in embedded capacitors. For example, a layer of polymer/oxide may be deposited on a layer of conductive material, such as copper or nickel foil, and a layer of metal, again, for example, copper or nickel, deposited on the other side of the polymer/oxide layer. Either or both conductive layers may then be patterned by photolithographic methods known in the art. A structure containing multiple capacitors may thereby be formed. Such multi-capacitor structures may be embedded in a multi-layer printed circuit board device.

The polymer or polymer precursors are deposited in a spray, and the metal or metalloid oxide is deposited from the CCVD flame that also evaporates solvent and, if the polymer or precursor is curable, forms or cures the polymer.

Thin films of metal oxides and metalloid oxides, such as alumina and silica, have been previously described as suitable layers for embedded capacitors, e.g., U.S. patent application Ser. No. 09/283,100 filed Mar. 31, 1999, the teachings of which are incorporated herein by reference. As noted above, for certain specialized electronic applications, dielectric materials having low dielectric constants are required. For capacitors, higher dielectric constant materials may be desired.

Metal oxides and metalloid oxides, such as alumina and silica are useful as capacitor dielectric layers. Higher dielectric constants may be achieved in certain mixed metal oxides. One particular mixed metal oxide contemplated for use in the present invention is barium strontium titanate (BST). The term BST is used herein to refer to $Ba_xSr_{1-x}TiO_3$ where x is between 0 and 1. That is, BST is used herein to refer to $BaTiO_3$, $SrTiO_3$, and any molar ratio of Ba:Sr in between. Generally, the molar ratio of Ba:Sr is between about 8:2 and about 2:8, preferably between about 7:3 and about 3:7, most preferably between about 6:4 and about 4:6. Deposition of BST and other mixed oxides by CCVD techniques is taught, for example, in U.S. Pat. No. 5,997,956, the teachings of which are incorporated by reference.

Thin films purely of oxides have high dielectric constant and may make good capacitor dielectric layers for thin film capacitors. However, layers purely of oxides may have micro-defects such as pinholes, cracks, and inter-crystalline boundaries that may allow current leakage and even electrical breakdown. When using CCVD techniques, certain oxides, such as BST, must be deposited at relatively high temperatures such as are inconsistent with deposition of these materials on heat-sensitive substrates.

The polymer/oxide mixtures that may be produced by co-deposition techniques of the present invention address these problems to a greater or lesser extent. The polymer acts as a binder curing any micro-defects of an inorganic oxide layer. The non-flame polymer spray mitigates the high temperatures of the CCVD flame.

Polymer/oxide layers have been used as dielectric materials for capacitors previously. The most common prior art method of making such layers is spin-coating. A solution of polymer containing dispersed powders of dielectric materials is spin-coated onto a substrate, and the solvent allowed to evaporate. One problem with spin-coating is that the oxide-loading in the polymer binding is limited as viscosity becomes too high with other than low loading. To produce very fine powders by spin-coating, very minimal loading is required. The present invention may be used to produce very fine powders from more concentrated solutions. Sub-micron size powder particulates are easily achievable, an in some cases it is believed that finer powders may be achieved by the method of the invention than are achievable by spin coating.

By use of the CCVD/spray co-deposition of the present invention, there is substantially no limit to the relative ratios of polymer to oxide, and weight ratios of polymer-to-oxide anywhere between 100% polymer and 100% oxide may be achieved by the method of the present invention. Generally, the polymer and the oxide are present as a meaningful co-component at relative weight ratios ranging from 1:99 to 99:1. The relative weight ratios of polymer-to-oxide depends on the result desired. At all weight ratios, the polymer and oxide are intimately and homogeneously mixed. At high polymer-to-oxide ratios, the polymer is believed to exist in a continuous phase with the oxide dispersed therethrough, either as individual separate molecules or as nano-clusters, generally less than about 10 nanometers, typically less than about 4 nanometers in diameter. At high polymer-to-oxide ratios, the oxide serves primarily to modify the dielectric constant of the polymer. Because the whole range of polymer-to-oxide weight ratios may be deposited by the co-deposition method of the present invention, from 100% polymer to 100% oxide, the dielectric constant can be closely tailored to the requisite dielectric constant of the particular application. As an approximation, the dielectric constant of the mixed polymer/oxide material will be the weighted average of the dielectric constants of the two materials. However, the precise polymer-to-oxide ratio needed to provide a precise dielectric constant may be empirically determined. The intimate, homogeneous mixing of the polymer and oxide by the co-deposition technique of the present invention provides for more precise control of dielectric constant than polymer, oxide particle mixing.

At low polymer-to-oxide ratios, i.e., high oxide levels, the dielectric constant of the mixed layer approaches the dielectric constant of the pure oxide. At these levels, the polymer primarily serves as a binder and filler function, curing microdefects and closing pinholes.

CCVD may be used to deposit substantially any oxide of a metal, metalloid or mixtures of metals, metalloids, and metal/metalloid combinations. Because a single solution containing precursor compounds for all oxidize-able metals and metal oxides to be deposited provides the source of the oxide, mixed oxides of precisely determined molar ratio can be deposited.

The polymer used in mixed polymer/oxide layer may be any polymer that can be deposited, either as the polymer or as the polymer precursor, by the method described herein. For many applications a heat-resistant polymer is preferred, such as polyimide and polyamide/imide. However, other polymers such as polyepoxides, polyamides, polyacrylates, polyesters, polyurethanes and mixtures of such polymers may also be used. Also, the polymer may contain suspended particulates of insoluble polymers, such as polytetrafluoroethylene, may be incorporated for adjusting characteristics of the coating, such as dielectric constant.

The co-deposition process of the present invention may be used to deposit very thin films of dielectric material, substantially thinner than may be deposited by spin-coating. Dielectric layers deposited in accordance with the present invention range in thickness from about 50 to about 60000 nanometers, preferably from about 1000 to about 35000 nanometers.

The invention further provides for formation of thin films of difficult to dissolve polymers such as polytetrafluoroethylene (Teflon) and liquid crystalline polymers. Liquid crystalline polymers are described, for example, in U.S. Pat. Nos. 6,180,024 and 6,174,405, the teachings of each of which are incorporated herein by reference. These polymers can only be dissolved in dangerous and difficult to work with solvents, such as strong acids. Liquid crystalline polymers include both lyotropic liquid crystalline polymers, such as poly(benzamide) and poly (1,4-phenylene terepthalamide, and thermotropic liquid crystalline polymers such as those sold under the trademarks, Xydar®, Vectra® A950, and Rodrun®. Rodrun® is a block copolymer of hydroxy benzoic acid/polyethylene terephthalate. Vectra® is a block copolymer of hydroxy benzoic acid/hydroxy napthelenic acid, and Xydar® is a block copolymer of hydroxy benzoic acid/bisphenol-terephthalic acid.

Thin films of such polymers are desirable in electronic packaging. Teflon® (polytetrafluoroethylene) and liquid crystalline polymers are highly impermeable to gases and thereby provide the requisite moisture-resistance for highly moisture-sensitive electronic components. Even very thin films of such polymers can provide mechanical stability to electronic components. Because of the ever present need for miniaturization it is desirable to provide very thin films of such polymers, i.e., 10 microns thick or less, preferably 1 micron thick or less, and more preferably 0.5 micron thick or less. Films in accordance with the invention can be practically produced down to about 0.1 micron. Abovementioned U.S. Pat. No. 6,174,405 describes thin films of liquid crystal polymers as thin as 0.002 inches, i.e., 50 microns; thinner films are desired and are provided by the method of the invention.

The invention provides for deposition of very thin films of hard to dissolve polymers. Very small particles, i.e., particles of 1 micron or less mean particulate size, preferably 0.5 micron or less, are suspended in a liquid, such as an organic liquid or even water. Concentrations of the polymer in the suspension is low, i.e., 10% by weight or less (relative to weight of the liquid), and generally 1% or weight or less. There is no real lower limit to the concentration of the polymer; however, it is generally impractical to form coatings from suspensions containing less than 0.01 wt % polymer.

The suspensions of polymer are applied to the substrate by a finely divided spray in which the droplet size is 10 micron or less, preferably 1 micron or less. Simultaneously, heat is applied that is sufficient to vaporize the liquid, melt and fuse the polymer particulates, and adhere the fused polymer to the substrate. The heat may be applied by a co-applied flame as described above, or by other means, such as direct heat to the substrate. By control of particle size and concentration, controlled low levels of polymer can be applied to a substrate surface so as to produce very thin films of the polymer.

As described above, when a flame is the heat source for vaporizing the carrier liquid and fusing the polymer, materials produced in the flame, such as oxides, metals, etc., can be co-deposited with the polymer particulates to modify the thin films which form and impart sought after characteristics.

The invention will now be described in greater detail by way of specific examples.

EXAMPLES 1 (A–C)

Anti-Glare Coating on Glass

A spray solution was prepared containing 1.02 g. vinylterminated polydimethylsilane (PDMS), 0.11 g polyhydroxymethylsilane (PHMS), 0.1 g allyltrimethoxysilane (ATMS) 0.01 g. Pt-complex, plus 200 g technical grade toluene.

A flame solution was prepared containing 26.4 g. tetraethoxysilane (TEOS) (2.1 wt % Si in toluene), 50.5 g technical grade toluene, and 200 grams of propane.

| DEPOSITION PARAMETERS | 1A Spray | 1A Flame | 1B Spray | 1B Flame | 1C Spray | 1C Flame |
|---|---|---|---|---|---|---|
| Minutes | 10 | 12 | 15 | 15 | 15 | 15 |
| Flow, ml/min | 3 | 3 | 3 | 3 | 3 | 3 |
| Temperature ° C. | — | 500 | — | 500 | — | 500 |
| P $O_2$, psi | 890 | 22 | 1140 | 22 | 1200 | 22 |
| Flow, lpm | 80 | — | 80 | — | 80 | — |
| Variac (amp) | 2.61 | 2.8 | 2.83 | 2.8 | 2.78 | 2.8 |
| Distance* | 60 | — | 65 | — | 60 | — |
| Hood Flow (fpm) | 100 | | 100 | | 100 | |

*millimeters between spray nozzle and substrate
Results were as follows:
A: Coating appeared to be wet. There were rastering lines on the coating.
B. Coating was soggy and anti-glare property was light. Rastering was eliminated.
C. Deposition ran well. Anti-glare property was great. Very slight boundary.

EXAMPLES 2 (A–B)

Hydrophobic Coating on Glass

A spray solution was prepared containing 30 g PDMS, 6 g PHMS, 0.1 g ATMS, plus 300 g technical grade toluene.

A flame solution was prepared containing 26.4 g. TEOS (2.1 wt % Si in toluene), 50.5 g technical grade toluene, and 200 grams of propane.

| DEPOSITION PARAMETERS | 2A Spray | 2A Flame | 2B Spray | 2B Flame |
|---|---|---|---|---|
| Minutes | 2 | 4 | 1 | 2 |
| Flow, ml/min | 6 | 3 | 6 | 3 |
| Temperature ° C. | 73 | 25 | 72 | 26 |
| P $O_2$, psi | — | 80 | — | 80 |
| Flow, lpm | 4.7 | 4.7 | 4.7 | 4.7 |
| Variac (amp) | 4.3 | 2.2 | 4.3 | 2.2 |
| Distance* | 55 | — | 55 | — |
| Hood Flow (lpm) | 15 | 15 | 15 | 15 |

*millimeters between spray nozzle and substrate
Results:
A: Hydrophobic in most areas; clear.
B: Slightly hydrophobic; clear.

EXAMPLES 3 (A–D)

UV-Blocking, Anti-Glare Coating on Glass

A spray solution was prepared containing 1 g PDMS, 0.1 g PHMS, 0.1 g ATMS, plus 200 g technical grade toluene.

A flame solution was prepared containing 4.68 g. TEOS (2.1 wt % Si in toluene), 41.8 g technical grade toluene, and 204 grams of propane.

| DEPOSITION PARAMETERS | 3A Spray | 3A Flame | 3B Spray | 3B Flame | 3C Spray | 3C Flame | 3D Spray | 3D Flame |
|---|---|---|---|---|---|---|---|---|
| Minutes | 10 | — | 10 | — | 10 | — | 10 | — |
| Flow, ml/min | 3 | 3 | 3 | 3 | 3 | 3 | 3 | 3 |
| Temp. ° C. | — | 360 | — | 376 | — | 486 | — | 580 |
| P $O_2$, psi | 80 | — | 80 | — | 80 | — | 80 | — |
| Flow, lpm | 5.6 | 5.0 | 5.6 | 5.0 | 5.6 | 5.0 | 5.6 | 5.0 |
| Variac (amp) | 2.89 | 1.9 | 2.69 | 2.1 | 2.71 | 2.0 | 2.51 | 2.1 |
| Distance* | 70 | — | 70 | — | 70 | — | 70 | — |
| Hood Flow (lpm) | 100 | 100 | 100 | 100 | 100 | 100 | 100 | 100 |

*millimeters between spray nozzle and substrate
Results:
A. Good even coating. Good anti-glare (AG) properties. Increased temperature of curing by increasing flow rate of CCVD flame.
B. Good even coating. Moved flame close to substrate to improve heating.
C. Spray had a pulse at the beginning of the run resulting in uneven coating, but good AG properties.
D. Good coating run, but surface was burned when flame surged for an instant. Increased Variac to reduce the probability of surging.

EXAMPLES 4 (A–C)

Release Coating on Paper

A spray solution was prepared containing 10 g PDMS, 0.24 g PHMS, plus 150 g technical grade toluene. In run C, 100 ml deionized water replaced the toluene.

A flame solution was prepared containing 2 ml. TMS 60 g isopropyl alcohol, and 150 grams of propane.

| DEPOSITION PARAMETERS | 4A Spray | 4A Flame | 4B Spray | 4B Flame | 4C Spray | 4C Flame |
|---|---|---|---|---|---|---|
| Minutes | 15 | 20 | 15 | 20 | 15 | 18 |
| Flow, ml/min | 3 | 3 | 3 | 3 | 3 | 3 |
| Temp. ° C. | — | 370 | — | 350 | — | 315 |
| P $O_2$, psi | 790 | 226 | 2460 | 224 | 170 | 229 |
| Flow, lpm | 5.6 | 5.0 | 5.6 | 5.0 | 5.6 | 5.0 |
| Variac (amp) | 2.66 | 1.32 | 2.60 | 1.25 | 3.65 | 1.20 |
| Distance* | 95 | — | 85 | — | 85 | — |
| Hood Flow (lpm) | 100 | | 100 | | 100 | |

*millimeters between spray nozzle and substrate
Results:
A: Pump Pressure on polymer spray solution climbed steadily. Coating is cured and uniform. High contact angle.
B: Pressure gradually climbed during deposition. During cleaning step the pressure spiked, then dropped down to 390 psi. Coating appeared cured and uniform. High contact angle.
C: Bottom "L" clip came loose during post-cure and burnt the corner of the substrate. Pressure was very low and stable during entire deposition. The spray was pulsing between spray and stream; made substrate wet. During cure, temperature was measured at 370° C. Substrate was overheated. High contact angle.

EXAMPLE 5 (A, B)

Polyamic acid was prepared from 0.41 g oxydianiline, 0.45 g pyromelliticdianhydride in 24.85 g. dimethylacetamide and 46.68 g. methanol. The solution was sprayed on a stainless steel substrate as a fine aerosol and a propane flame applied to the area of spray deposition. Conditions were as follows:

| Parameters | Spray (A) | Flame (A) | Spray (B) | Flame (B) |
|---|---|---|---|---|
| Time (min) | 9.0 | 9.0 | 21 | 21 |
| Flow (ml/min) | 3.0 | 5.0 | | 40 |
| Pressure (bar) | 8–10 | 77–80 | 250 ($N_2$) | 78 |
| $O_2$, psi | | 80 | | 80 |
| $O_2$ flow, lpm | | 5.31 | | 5.31 |
| Variac | 3.50 | 3.0 | 2.85 | 2.65 |

Polyimide was produced in each case. Gold dots were applied to various points on the surface of the polyimide films. Electrical tests showed substantial resistance in each case.

EXAMPLE 6

In this example a three layer coating was produced on a polycarbonate substrate by a silica-producing flame (1), co-deposition of a silica-producing flame (2A) and a polysiloxane-producing spray (2B) and a silica flame (3). The silica-producing flames used a solution of 21 ml. tetramethylsilane, 360 grams isopropanol and 900 g. propane. The spray solution was 1 g. polydimethylsiloxane, 0.5 g. polyhydromethylsiloxane (25–35 cst), 0.1 g allyltrimethoxysilane, plus 1 drop of a platinum catalyst, Pt cyclovinylsiloxane.

| Parameters | Flame (1) | Flame (2A) | Spray (2B) | Flame (3) |
|---|---|---|---|---|
| Time (min) | 30 | 10 | 10 | 30 |
| Flow (ml/min) | 5 | 5 | 3 | 5 |
| Pressure (bar) | 408 | 200 | 200 | 400 |
| $O_2$, psi | 1209 | 1256 | 151 | 1256 |
| $O_2$ flow, lpm | 4.7 | 4.7 | | 4.7 |
| Variac | 2.80 | 2.80 | 4.2 | 2.80 |
| Redirect flow (lpm) | 50 | 14 | | 50 |
| Redirect nozzle Distance (mm) | 59 | 59 | | 59 |
| Nozzle flow (fpm) | 100 | 100 | 100 | 100 |

The spray angle for spray (2B) was 45 degrees.

EXAMPLE 7 (A–D)

In this example four coatings (A–D) of polyamideimide were produced by deposition of aerosols (SA–SD) of polyamic acid solutions along with flames (FA–FD). The polymer solution was 20 g. of a low viscosity polyamic acid having amide bonds obtained from B.P. Amoco dissolved in 200 grams of deionized water. The solution also contained 0.1 gm. Of 3-aminopropyl triethyethoxysilane as an adhesion promoter. The flame was produced by burning a solution of 60 grams toluene, 160 grams propane.

Deposition conditions were as follows:

| Parameters | SA | FA | SB | FB | SC | FC | SD | FD |
|---|---|---|---|---|---|---|---|---|
| Time (min) | 15 | 20 | 10 | 15 | 8:25 | 13:25 | 17 | 21 |
| Flow (ml/min) | 3 | 3 | 3 | 3 | 3 | 3 | 3 | 3 |
| Temp. deg. C. | | 250 | | 250 | | 250 | | 250 |
| Pressure* | 340 | 18 | 400 | 61 | 430 | 63 | 320 | 67 |
| $O_2$, psi | 80 | | 80 | | 80 | | 80 | |
| $O_2$ flow, lpm | 6.4 | 4.4 | 6.4 | 4.4 | 6.4 | 4.4 | 6.4 | 4.4 |
| Variac | 4.5 | 2.15 | 4.5 | 2.15 | 4.5 | 2.15 | 4.5 | 2.15 |
| Spray/Substrate Distance (mm) | 85 | | 75 | | 85 | | 85 | |
| Nozzle dist. (mm) | 15 | | 15 | | 15 | | 15 | |
| Hood flow (fpm) | 100 | | 100 | | 100 | | 100 | |

*spray pressure in psi, flame in bar

EXAMPLE 8 (A–C)

In this example mixed a polymeric material containing platinum from a flame source and black pigment from the polymer source was deposited on an aluminum substrate. The polymer solution contained 100 g. of toluene, 1 g polydimethylsiloxane, 0.56 g polyhydromethylsiloxane, 0.1 g. allyltrimethoxysilane, 1 drop Pt cyclovinylsiloxane complex, and 0.451 g. UCTS, a commercial black pigment of Cr, Mg and Mn. The flame solution was propane containing 0.01 M. Pt acetylacetonate plus 2% acetone plus 5% DMF. Deposition conditions were as follows:

| Parameters | FA | SA | FB | SB | FC | SC |
|---|---|---|---|---|---|---|
| Time (min) | 15 | 13 | 5 | 5 | 9 | 9 |
| Flow (ml/min) | 5 | 3 | 5 | 3 | 5 | 3 |
| Temp. deg. C. | 78 | | 150 | 15 | 250 | 25 |
| Pressure (psi) | 90 | 176 | 95 | 15 | 92 | 16 |
| $O_2$, psi | 80 | | 80 | | 80 | |
| $O_2$ flow, lpm | 4.7 | | 4.7 | | 4.7 | |
| Variac | 2.76 | 4.4 | 4.69 | 3.9 | 4.39 | 3.4 |
| Hood flow (fpm) | 100 | 100 | 100 | 100 | 100 | 100 |

EXAMPLE 9

A polymer solution was prepared from 0.5 g. polyacrylic acid, 0.01 g. HCl in 300 g. deionized water. The flame was produced from 200 g. propane. The polyacrylic acid was prepared under the following conditions.

| Parameters | Spray | Flame |
|---|---|---|
| Time (min) | 10 | 13 |
| Flow (ml/min) | 3 | 3 |
| Temp. deg. C. | | 550 |
| Pressure (bar) | 200 | 18 |
| $O_2$, psi | | 80 |
| $O_2$ flow, lpm | 3.7 | 1.45 |
| Hood flow | 21" | |

EXAMPLE 10 (A AND B)

A polymer solution was prepared from 2 g. of a polydimethylsiloxane/polyethyleneoxide co-polymer, 0.2 g. polymethylhydrosiloxane, 0.1 g. allyltrimethoxysilane in 200 g. toluene. The flame was a propane flame. Deposition conditions were as follows:

| Parameters | SA | FA | SA | FA |
| --- | --- | --- | --- | --- |
| Time (min) | 12 | 14 | 12 | 14 |
| Flow (ml/min) | 3 | 3 | 3 | 3 |
| Temp. deg. C. | | 200 | | 210–230 |
| Pressure (bar) | 100 | 14 | 54 | 14 |
| $O_2$, psi | | 80 | | 80 |
| $O_2$ flow, lpm | 2 | 4.7 | 2 | 4.7 |
| Variac | 4.7 | 1.5 | 4.9 | 1.2 |
| Hood flow (fpm) | 80 | | 80 | |

EXAMPLE 11

A polymer solution is prepared containing 100 g water, 10 g polyamide/imide precursor, and 0.11 g. gamma amino propyl silane. A flame solution was prepared containing 8.1 g. of an aluminum acetylacetonate solution containing 0.1 wt % aluminum, 5.99 g. toluene, and 200 g. propane. Deposition coatings were as follows:

| | Polymer Solution | Flame Solution |
| --- | --- | --- |
| Minutes | 20 | 21:32 |
| Flow, ml/min | 3 | 3 |
| Temperature ° C. | | 255 |
| Pressure (PSI) | 230 | 900 |
| $O_2$ psi | 80 | 80 |
| Flow $O_2$ lpm | 6.4 | 3.6 |
| Substrate distance (mm) | 85 | 85 |
| Hood Flow, lpm | 100 | 100 |

A 40 micron thick coating was deposited. Breakdown voltage was measured at 1687 volts. Adhesion of the coating to the substrate was measured at 3352 psi.

EXAMPLE 12

A thermotropic liquid crystalline polymer in powder form sold under the trademark Xydar® is suspended in isopropanol to a concentration of 0.1% by weight. The substrate was a 3.81×3.81 wafer of aluminum. Deposition conditions were as follows:

| | |
| --- | --- |
| Run time, spray and flame | 49 minutes |
| Flame only post-cure | 12 minutes |
| Curing flow, ml/min | 4.0 |
| Curing atomizer power | 3.45 amps |
| Suspension line pressure (psi) | 5.0 |
| Fluid height (ml) | 344 |
| Flame pump pressure (psi) | 250 |
| Air Pressure (psi) | 80 |
| Oxygen Pressure (psi) | 80 |
| Suspension flow rate at nozzle | 11.5 liters per minute |
| Flame-producing liquid flow rate at nozzle | 4.0 liters to minute |
| Polymer nozzle to substrate distance | 20.5 cm. |
| Nozzle height suspension/flame | 209/304 |
| Hood Flow (ft./min) | 100 |
| A continuous layer of liquid crystal polymer was deposited. | |

Several advantages of the invention over other deposition methods should be appreciated. An advantage of this co-deposition process versus thermal spray is that the materials here are not subjected directly to the high heat zone of a plasma which would cause many materials, especially small grain materials, to be evaporated. The co-deposition process allows such material to maintain more of a size close to their original size without melting and/or agglomerating. Also a number of materials subjected to a plasma spray environment are decomposed or excessively altered in chemistry, phase, or shape. The present invention enables materials such as polymers, very fine grains, silicas, etc. to be deposited without excessively altering the properties or decomposing the materials. The materials are able to be broken up and sprayed at a surface prior to being subjected to the heat. The heat is more focused at the surface and not at the spray itself, but usually in the area of where the spray intercepts the surface so the particles are only heated slightly prior to meeting the surface. If the heat source, i.e., heated gases, were too distal from the spray impact area, and if a liquid spray were used, then the materials might drip and run. By having the hot gases present right at the surface of the spray, the liquid is able to be evaporated. If a powder is being deposited, the powder is able to sinter and form onto the surface rather than being blown off the surface. So it is enabled for the powder to become a little sticky just prior to the surface contact if it were a dry powder feed versus the wet.

These aspects significantly differentiate the present invention from the thermal spray or processes where a substrate is sprayed and then heated afterwards to cause the coating to densify with the advantages of no dripping occurring and more material sticking to the surface.

The co-deposition process is also significantly different from spray pyrolysis where the substrate is heated to a higher point wherein many substrates cannot handle the correct heat amount required to cause the coating to become coherent. It is difficult to heat a subject, in particular a smaller coating patch, in certain areas of a larger substrate.

The particles that are co-deposited can be man-made or of natural materials of natural size or ground powders. Potentially material from nature include clays, zeolites, micas and other materials that can be aligned in certain structures for increased strength or gas diffusion barrier type properties. Plate-like materials when deposited by the present invention can form a preferred orientation, e.g., laying down with the plate surfaces normal to the flame aligning with the surface of the substrates.

While the invention has been described specifically with reference to certain preferred embodiments, modifications obvious to one with ordinary skill in the art may be made without departing from the scope of the present invention. For example, while the invention has been described in terms of apparatus having a single flame spray and a single non-flame spray, more than one spray of each could be used. One non-flame spray could be a solution of a cross-linking polymer while another non-flame spray could provide a highly reactive cross-linking agent for the polymer.

What is claimed is:

1. A method of depositing a polymer coating on a substrate surface comprising
   providing a fluid that is a dispersion or a solution of said polymer or a precursor of said polymer in a liquid medium,
   forming a finely divided aerosol of said fluid,
   applying said aerosol to said substrate surface to coat said surface with said fluid, and
   substantially simultaneously applying a flame to said substrate surface so as to remove said liquid medium and to produce said coating.
2. The method of claim 1 wherein said polymer is deposited to form a thin film coating that is about 10 microns thick or less.

3. The method of claim 1 wherein said flame co-deposits a material along with said fluid.

4. The method of claim 3 wherein said co-deposited material is selected from the group consisting of a metal oxide, a metalloid oxide, a mixed metal/metalloid oxide, and mixtures thereof.

5. The method of claim 3 wherein said co-deposited material comprises a metal.

6. The method according to claim 1 wherein said deposited polymer is selected from the group consisting of polymethylmethacrylate, polyethylene glycol, polyacrylic acid, polyester, polyamide, polyaniline, polyolefin, and mixtures thereof.

7. The method according to claim 1 wherein said deposited polymer is selected from the group consisting of polyimide, polyamide/imide and mixtures thereof.

8. The method according to claim 1 wherein said deposited polymer is selected from the group consisting of a cross-linking epoxy resin, polysiloxane, polyurethane and mixtures thereof.

9. The method according to claim 1 wherein said deposited polymer is selected from the group consisting of poly(meth)acrylate acid, poly(meth)acrylic acid, poly(meth)acrylate, polystyrene, poly(meth)acrylate, polyimide, poly(meth)acrylate, epoxy and mixtures thereof.

10. The method according to claim 1 wherein said flame is produced from a solution that contains finely divided particulate material.

11. The method according to claim 1 wherein said polymer-containing fluid contains finely divided particulate matter.

12. The method according to claim 1 further comprising depositing from said flame a layer of inorganic material, either prior to depositing said polymer coating or subsequent to depositing said polymer coating.

13. The method according to claim 12 wherein said inorganic material layer is formed of material selected from the group consisting of oxides, metals, and mixtures thereof.

14. The method according to claim 12 wherein said fluid is a solution of polyamic acid in a liquid, whereby said coating comprises a material selected from a polyimide, a polyimide/polyamide, or a mixture thereof.

15. The method according to claim 1 wherein said aerosol has a mean droplet size of about 10 microns or smaller.

16. The method according to claim 1 wherein said aerosol has a mean droplet size of about 1 micron or smaller.

17. The method according to claim 1 wherein said aerosol is directed at a first location on said substrate surface and said flame produces heated gases directed at either said first location on said substrate surface or a second location closely adjacent said first location, whereby said heated gases have a physical and/or chemical effect on said applied fluid.

18. The method according to claim 17 wherein said flame comprises a plurality of flames disposed in surrounding relationship to said aerosol.

19. The method according to claim 18 wherein said aerosol has a first axis and said plurality of flames each have a flame axis and said first axis and each said flame axis form an angle therebetween, said angle being between 0 and 90 degrees.

20. A method of applying a film of polymer 10 microns or less to a substrate from a solution, the solution comprising suspended particulates of said polymer of mean particle size 1 micron or less in a carrier liquid to a concentration of 10 wt % or less based on weight of the carrier liquid, atomizing said suspension and directing the atomized suspension at the substrate to deposit the suspension on the substrate, and simultaneously applying heat to said deposited suspension sufficient to vaporize carrier liquid and fuse said particles into a thin film that adheres to the substrate.

21. The method of claim 20 wherein said particulates are of mean particle size of 0.5 micron or less.

22. The method of claim 20 wherein the concentration of polymer in suspension is 1 wt % or less based on the weight of liquid.

23. The method of claim 20 wherein the source of said heat is a flame.

24. The method of claim 20 wherein the source of said flame and wherein said flame contains or produces material that co-deposits with said polymer.

25. The method of claim 20 wherein the polymer is polytetrafluoroethylene.

26. The method of claim 20 wherein the polymer is a liquid crystalline polymer.

27. The method according to claim 20, wherein the thin film layer is 5 microns or less thickness and comprises a homogeneous mixture comprising a polymer selected from the group consisting of polytetrafluoroethylene, sulfonated polytetrafluoroethylene, liquid crystalline polymers, polyimides, polyamide/imides, and cross-linked polymers and an inorganic material selected from, nitrides, carbides, borides, metal oxides, metalloid oxides, mixtures of metal oxides, mixtures of metalloid oxides, and mixtures of metal and metalloid oxides.

28. The method of claim 27 wherein the thin film layer has a thickness of 1 micron or less.

29. The method of claim 27 wherein said inorganic material is the product of a flame.

30. The method of claim 27 wherein said inorganic material is a mixed metal oxide.

31. The method of claim 27 wherein said inorganic material is selected from strontium titanate, barium titanate, and barium strontium titanate.

32. The method of claim 27 wherein said inorganic material is selected from the group consisting of phosphates, borates and carbonates.

33. The method of claim 27 wherein said polymer is selected from the group consisting of polyimide, and polyamide/imide.

34. The method of claim 27 wherein said thin film comprises a polymer chosen from the group consisting of a cross-linked polysiloxane and a cross-linked polyepoxide.

35. The method according to claim 20 further comprising applying at least two outer layers of said polymer between about 10 and about 1000 nanometers thick and at least one inorganic oxide layer between about 10 and about 1000 nanometers thick.

36. The method according to claim 35 wherein at least one of said outer polymer layers comprises polyimide.

37. The method according to claim 35 wherein at least one of said outer polymer layers comprises polyimide/polyamide.

38. The method according to claim 35 wherein at least one of said outer polymer layers is chosen from the group consisting of a cross-linked epoxy and a cross-linked polyurethane and mixtures thereof.

39. The method according to claim 35 wherein at least one said outer polymer layers comprises cross-linked polyacrylic acid.

40. The method according to claim 35 wherein at least one of said outer polymer layers comprises cross-linked polysiloxane.

41. The method according to claim 35 wherein said oxide comprises silica.

42. The method according to claim 35 wherein said oxide comprises a metal oxide.

43. The method according to claim 35 wherein said at least one oxide layer is porous.

44. The method according to claim 35 wherein said at least one oxide layer is dense.

45. The method according to claim 35 wherein said polymer layers fill any defects in said inorganic oxide layer.

* * * * *